US012757259B2

(12) United States Patent
Delp et al.

(10) Patent No.: US 12,757,259 B2
(45) Date of Patent: Oct. 6, 2026

(54) CONFIGURING BACKUP WIRELESS ACCESS POINTS (WAPS)

(71) Applicant: Amazon Technologies, Inc., Seattle, WA (US)

(72) Inventors: Denny Drivas Delp, Austin, TX (US); Casey Eric Edwards, Austin, TX (US); Hsuan-Man Hung, Miaoli (TW); Wei-Chun Wang, New Taipei City (TW); Matthew James Richards, San Francisco, CA (US); Benjamin Jeffrey Lowe, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 306 days.

(21) Appl. No.: 18/373,022

(22) Filed: Sep. 26, 2023

(65) Prior Publication Data

US 2025/0024523 A1 Jan. 16, 2025

Related U.S. Application Data

(60) Provisional application No. 63/526,104, filed on Jul. 11, 2023.

(51) Int. Cl.
*H04W 76/10* (2018.01)
*H04W 48/16* (2009.01)

(52) U.S. Cl.
CPC ........... *H04W 76/10* (2018.02); *H04W 48/16* (2013.01)

(58) Field of Classification Search
CPC ...... H04W 76/10; H04W 48/16; H04W 48/20
See application file for complete search history.

(56) References Cited

U.S. PATENT DOCUMENTS

| | | | | |
|---|---|---|---|---|
| 2007/0274274 | A1* | 11/2007 | Carothers | H04W 48/20 370/395.2 |
| 2010/0113027 | A1* | 5/2010 | Hsu | H04W 36/0005 455/436 |
| 2017/0078885 | A1* | 3/2017 | Huber | H04L 63/101 |
| 2017/0135145 | A1* | 5/2017 | Amini | H04L 45/20 |
| 2017/0352244 | A1* | 12/2017 | Moore | H04W 68/02 |
| 2018/0242379 | A1* | 8/2018 | Turon | H04W 12/35 |
| 2019/0037613 | A1* | 1/2019 | Anantharaman | H04W 12/06 |
| 2021/0014907 | A1* | 1/2021 | Fraser | H04L 41/12 |
| 2022/0046521 | A1* | 2/2022 | Ghessassi | H04W 48/16 |
| 2023/0309001 | A1* | 9/2023 | Vos | H04W 24/02 |
| 2024/0040659 | A1* | 2/2024 | Rodriguez | H04W 76/25 |

* cited by examiner

*Primary Examiner* — Nizar N Sivji
(74) *Attorney, Agent, or Firm* — Eversheds Sutherland (US) LLP

(57) ABSTRACT

The disclosure describes techniques for configuring wireless routers of a wireless mesh network with one or more secondary wireless access points (WAPs) such that client devices connected to the mesh network may remain online in the event that a primary WAP goes offline or otherwise becomes unavailable. For instance, a user of the wireless mesh network may specify a device, such as a mobile electronic device connected to a cellular network, to operate as a secondary WAP in the event that a primary WAP becomes unavailable. Thereafter, upon a wireless router of the mesh network detecting that the primary WAP is unavailable, the wireless router may perform a network scan to identify SSID(s) that are available within the environment. The wireless router may also instruct the other routers of the mesh network to perform a network scan.

21 Claims, 18 Drawing Sheets

CONFIGURING BACKUP WIRELESS ACCESS POINTS (WAPS)

RELATED APPLICATIONS

This application claims priority to U.S. Provisional Patent Application No. 63/526,104, filed on Jul. 11, 2023, the entire contents of which are incorporated herein by reference.

BACKGROUND

As computing devices continue to evolve, the amount of computing devices used in everyday life continues to proliferate. For instance, daily life often includes use of an array of client computing devices, such as mobile phones, tablet computing devices, voice-controlled devices, smart televisions, HDMI plug-in sticks, audiovisual devices, and the like. In many instances, each of these client computing devices are configured to access content and/or communicate with other devices over the Internet by connecting to a wireless access point (WAP) within the home, office, or other environment. Given the ever-increasing number of devices within different environments, as well as users' ever-increasing reliance on these devices, ensuring connection between each client device and a local WAP remains important.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
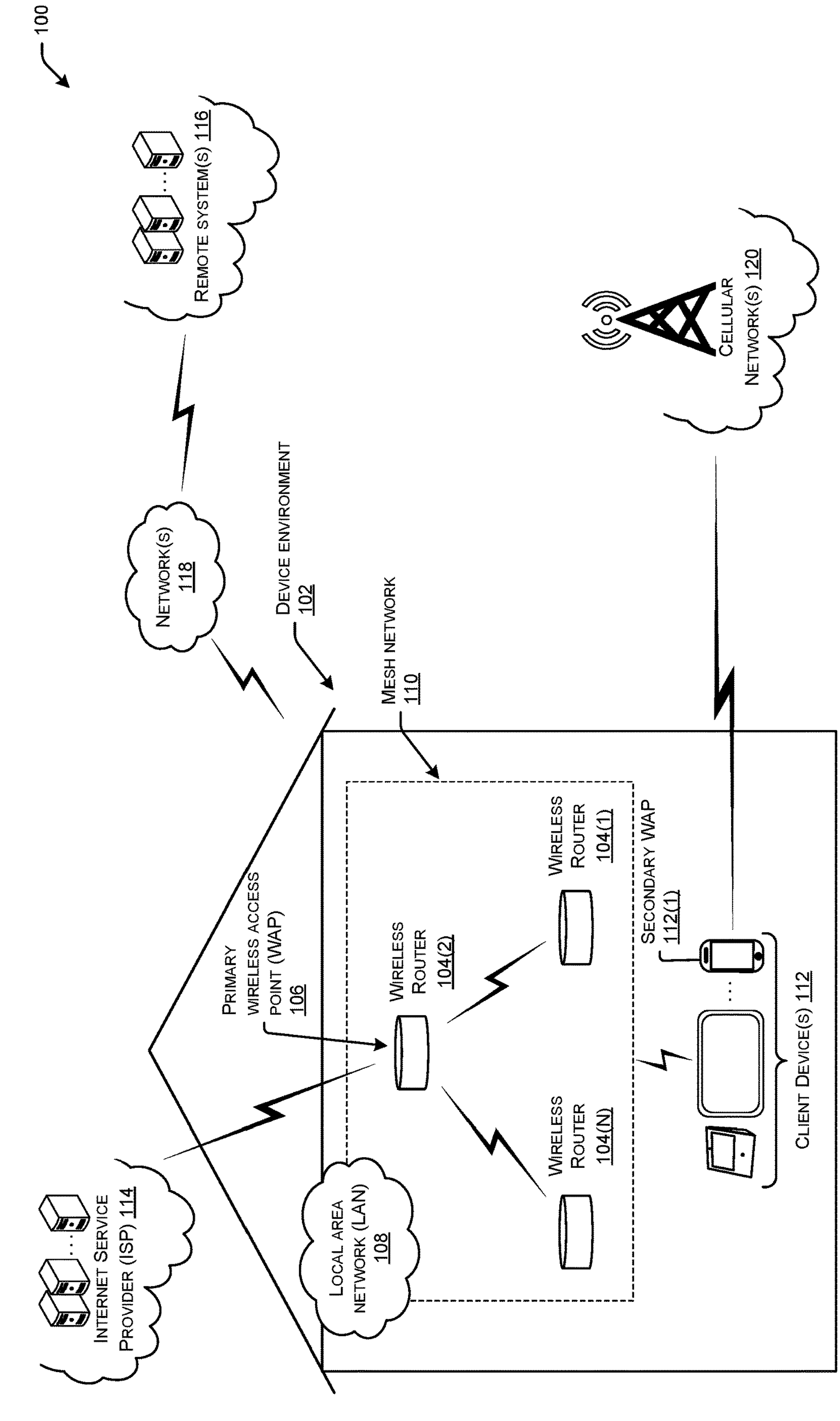
FIG. 1 illustrates a schematic diagram of an illustrative architecture including a device environment that includes a mesh network of multiple wireless routers, one or more of which is connected to an Internet Service Provider (ISP) and operates as a primary wireless access point (WAP) within the environment. In some instances, the system may store an indication that a second device is to function as a secondary WAP in the event that the ISP becomes unavailable, such that the mesh network of routers wireless connects to the secondary WAP upon detecting that the ISP is unavailable.

Wireless-communication technology, such as Wi-Fi, allows people to connect to the Internet wirelessly and access online services from anywhere in the coverage area. Wireless connection has revolutionized the way people work and communicate and is widely considered as the dominant solution to provide fast, reliable, and secure connectivity to the Internet and other network-based resources. Thus, the quality and performance of wireless connections remains important for user experiences on the Internet and otherwise.

The disclosure describes techniques for configuring wireless routers of a wireless mesh network with one or more secondary wireless access points (WAPs) such that client devices connected to the mesh network may remain online in the event that a connection to an ISP or other network source becomes unavailable. That is, one or more devices may operate, when the ISP connection is down, as a WAP that creates a wireless local area network (WLAN) for devices within the environment. In some instances, a secondary WAP comprises the device that provides network connectivity to other routers and/or client devices in the environment in response to the primary WAP losing connectivity a server of the ISP/network provider or otherwise ceasing to provide network connectivity to other routers and/or client devices in the environment.

For instance, a user of the wireless mesh network may specify a device, such as a mobile electronic device connected to a cellular network, to operate as a secondary WAP in the event that the ISP or other primary network provider becomes unavailable. Thereafter, upon a wireless router of the mesh network detecting that the ISP is unavailable, the wireless router may perform a network scan (e.g., WiFi scan) to identify service set identifier(s) (SSID(s)) of devices that are available within the environment as potential WAPs. As is known, an SSID of a device may comprise a sequence of characters that identifies the device.

For instance, the wireless router may perform a WiFi scan to identify SSIDs of available WAPs that are within a wireless range of the wireless router. That is, a radio of the wireless router may send a probe request and listen for a response to the probe from one or more WAPs. Each probe response may include information, such as an SSID of the responding WAP. The wireless router may determine that each WAP that provided a probe response is within range of, and potentially available for connection to, the wireless router. In addition, the wireless router may also instruct the other routers of the mesh network to perform a WiFi scan to identify WAPs that are available for connection by one or more of these wireless routers (i.e., those WAPs that are within a wireless range of the respective wireless router).

In response to one or more of the wireless routers determining that the mobile device (or other device indicated as the secondary WAP) has responded to the probe (e.g., with the SSID of the mobile device), the wireless router of the mesh network having the strongest connection to the mobile device may establish a connection to the mobile device. The wireless mesh network may then route data to and from the client devices of the environment through the router that has established the connection with the mobile device operating as the secondary WAP. This mobile device may then route the data to and from the cellular network or other network to which the mobile device is connected. Further, upon one or more wireless routers of the mesh network detecting that the connection to the ISP has again become available, one or more of the wireless routers may re-establish the connection with a server device associated with the ISP and disconnect from the secondary WAP.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative architecture 100 including a device environment 102 that includes a mesh network 110 of multiple wireless routers 104(1), 104(2), . . . 104(N). As illustrated, an example wireless router is connected to connects, physically or wireless, to a server computing device associated with an Internet Service Provider (ISP) or another network provider. As such, the wireless router 104(2) functions as a primary wireless access point (WAP) for the mesh network 110 and provides a local area network (LAN) 108 within the device environment 102. For instance, the router operating as the primary WAP may comprise the router that connects to: (1) the ISP server (e.g., via an ISP modem), and (2) other routers and/or other client devices in an environment to provide network connectivity to the other routers and/or client devices via one or more wireless standards (e.g., 802.11, 802.14, etc.). The other routers One or more client devices 112 may couple to one or more of the wireless routers 104 for connecting to the Internet or other network. For instance, a client device that has a strongest connection with the wireless router 104(N) (relative to other wireless routers of the mesh network 110) may connect to the wireless router 104(N), while a client device that has a strongest connection with the wireless router 104(1) (relative to other wireless routers of the mesh network 110) may connect to the wireless router 104(1), and so forth. Further, data routed to and from the client devices may route through the wireless router to which the client device is connected, to the gateway wireless router 104(2) acting as the primary WAP 106, and to the ISP 114 or another network provider. For instance, the gateway wireless router 104(2) may connect, in some instances, to an ISP modem, which in turn connects to a server or the ISP or other network provider. In these examples the router 104(2) may physically connect, via a wired connection, to the ISP modem and, thus, the ISP modem is external to the LAN 108. In other instances, the modem may be internal to the wireless router 104(2) (or whichever router operates at the gateway router). In each instance described herein, the wireless gateway router may connect to the ISP server either directly, via an ISP modem, and/or via one or more other devices.

Further, as client devices move throughout the device environment 102, the signal strengths between the respective client devices and the wireless routers may change, resulting in the client-device-to-wireless-router connections changing. The client devices 112 may comprise mobile phones, tablet computing devices, audiovisual devices, smart televisions, laptop computers, voice-controlled devices, HDMI plug-in sticks, wearable devices and/or any other type of client computing device.

In some instances, the system may store an indication that a second device is to function as a secondary WAP in the event that the ISP 114 or other network provider becomes unavailable, such that the mesh network 110 of routers wirelessly connect to the secondary WAP upon detecting that the ISP 114 or other network provider is unavailable. For instance, a user may configure one of the client devices 112 to function as a secondary WAP, a modem or other WAP connected to the same ISP 114, a different ISP, another network provider to function as a secondary WAP, and/or the like. Further, in some instances, a user may configure multiple devices to function as secondary WAPs, and may provide priority data indicating which secondary WAP should be connected to first upon the ISP connection failing, which secondary WAP should be connected to second (if the first option is not available), and so forth. That is, the user may indicate a first device that is to operate as a highest-priority secondary WAP such that this device will perform the role of secondary WAP if a connection to this device is available, a second device that is to operate a second highest-priority secondary WAP such that this device will perform the role of secondary WAP if a connection to the first device is not available but a connection to this second device is available, and so forth.

In the illustrated example, for instance, one of the client devices 112 may have been configured to operate as the secondary WAP 112(1) in the event that the ISP 114 becomes unavailable. While this figure illustrates a client device as operating as the secondary WAP, in other instances a device that is not a client device may be stored as the secondary WAP, such as a neighboring WAP (e.g., residing in an environment near the device environment 102), one of the wireless routers 104 connected to a different ISP or network provider, a non-illustrated electronic device, and/or the like. In some instances, a user may configure multiple secondary WAPs, such as a neighboring wireless router (e.g., a wireless router residing with a nearby environment and connected to an ISP), each mobile phone associated with the device environment 102, and so forth.

Regardless of the type of device being used as the secondary WAP, the secondary WAP may be connected to a network other than the currently unavailable ISP. Thus, the secondary WAP may function as a backup network in the event that the ISP becomes unavailable. For instance. FIG. 1 illustrates that the secondary WAP 112(1) in this example couples to a cellular network 120, although in other examples the secondary WAP may couple to wide area networks (WANs), LANs, satellite networks, and/or any other network provider. Further, it is noted that while a user may configure a wireless router (e.g., a wireless router residing in a neighboring building) to operate as a secondary WAP, the user may additionally or alternatively configure non-router devices as secondary WAPs. Stated otherwise, while a wireless router may comprise a secondary WAP, the secondary WAP need not comprise a wireless router. While the secondary WAP may comprise a device that allows devices to wirelessly connect to a network, a router creates a LAN and manages communications of each device of potentially multiple client devices that are connected to the router. For instance, the router may receive and send data between devices in the LAN and may use the wireless access point in the environment to connect to the Internet or other WAN. Given that the secondary WAP acts as the point of connection to the Internet or other WAN, the secondary WAP may, but need not, comprise a router. Therefore, the secondary WAP configured for an environment may comprise a wireless router, a mobile phone, or another device that provides a network connection via a means other than the connection to the ISP via the gateway router.

In order to configure the device as the secondary WAP 112(1), a user may interact with a remote system 116 over one or more networks 118. It is to be appreciated that the one or more networks 118 (and other networks described herein) which connect the devices in the environment 102 to the remote system 116 may represent an array or wired networks, wireless networks (e.g., Wi-Fi), or combinations thereof. The remote system 116 may comprise network-accessible systems—or "cloud-based systems"—implemented as computing infrastructures of processors, storage, software, data access, and so forth that is maintained and accessible via the network(s) 118, such as the Internet. Cloud-based systems may not require end-user knowledge of the physical location and configuration of the system that delivers the services. As illustrated, the remote system 116 may comprise network-accessible resource(s), such as servers. Multiple of such resources may be included in each of the system 116 and each may include processors and memory. As used herein, a processor may include a central processing unit (CPU) for processing data and memory may include computer-readable storage media storing computer-readable instructions that are executable on the respective processor(s). The computer-readable media may individually include volatile random access memory (RAM), non-volatile read only memory (ROM), non-volatile magnetoresistive (MRAM) and/or other types of memory.

For instance, prior to the ISP 114 becoming unavailable, a user may interact with the remote system 116 to designate the illustrated device as the secondary WAP 112(1). Again, the user may also interact with the remote system 116 to designate one or more other devices as additional secondary WAPs. In one example, the remote system 116 may send user-interface data to a client device allowing a user to specify credential data associated with the secondary WAP for use in connecting to the secondary WAP in response to the ISP 114 becoming unavailable. For instance, the user may provide, via the user interface, the SSID and password for the device that will operate as the secondary WAP. The remote system may receive and store this credential data and send this credential data to one or more of the wireless routers 104 of the mesh network 110. For instance, the remote system 116 may send the credential data to each router 104, or may send the credential data to one router (e.g., the gateway router 104(2) coupled to the ISP 114), which in turn may send this credential data to the other routers of the mesh network 110.

In addition, while this example describes a user configuring the secondary WAP 112(1) prior to termination of the connection with the ISP 114, in other instances the user may configure the secondary WAP 112(1) after termination of the connection with the ISP 114. In these instances, the client device may interact with a wireless router of the mesh network 110 for providing the credential data, which may be used to establish the connection with the secondary WAP.

Regardless of whether the secondary WAP 112(1) was configured before or after termination of the connection with the ISP 114, the credential data associated with the secondary WAP 112(1) may be used to establish the connection with the secondary WAP 112(1). For instances, upon the ISP 114 becoming unavailable, the gateway router 104(2) (and/or another router of the mesh network 110) may send instruction data to the other routers to begin performing a scan for available wireless networks. Further, the gateway router 104(2) (and/or another router of the mesh network 110) may also begin scanning the environment for available wireless networks.

After scanning the environment for the available wireless networks, each leaf node (e.g., each router other than the gateway router 104(2)) may send the SSIDs of the available potential WAPs it has identified to the gateway router, along with a respective signal strength (e.g., RSSI) associated with the SSID and a respective channel associated with the SSID. The gateway router 104(2) (or other router in other instances) may then determine, from the SSIDs, which corresponding device (if any) to which to connect to as a secondary WAP. For instance, if a user has specified a single secondary WAP, such as the secondary WAP 112(1), the gateway router may determine whether the secondary WAP is available for connection, that is whether this device was detected by one or more of the routers of the mesh network 110 (e.g., by receiving a response to a probe request). If so, then the gateway router 104(2) may determine which router of the mesh network 110 is to connect to the secondary WAP 112(1) with the greatest signal strength and may send instruction data to that wireless router to establish the connection with the secondary WAP 112(1). In some instances, the gateway router 104(2) may make this determination based on comparing strength, quality or the like of the signal of the secondary WAP 112(1) at each of the routers of the mesh network 110. For instance, the gateway router 104(2) may receive from each router of the mesh network 110, data indicating an RSSI (e.g., a value between 0 and 255) measured at the respective router and may select, as the router that is to connect to the secondary WAP 112(1), the router having the highest RSSI value (representing the highest quality connection). In another example, the gateway router 104(2) may receive from each router of the mesh network 110, data indicating the power ratio in decibels (dBm) measured at the respective router and may select, as the router that is to connect to the secondary WAP 112(1), the router having the lowest dBm value (representing the strongest signal strength). In other instances, meanwhile, the gateway router may analyze one or more other metrics, or combination of metrics, to determine which router is to connect to the secondary WAP 112(1).

In the event that a leaf node (e.g., a leaf router) has the strongest or highest-quality signal strength, the gateway router 104(2) may send an instruction to this leaf node to establish the connection and, in addition, the gateway router 104(2) may generate a network tunnel between the gateway router 104(2) and the router connected to the secondary WAP 112(1). Thereafter, the connected router may receive data from the client devices 112 in the environment, as well as data from the Internet and network, and send this data to the gateway router 104(2) via the network tunnel. The gateway router 104(2) may receive this network data and perform the traditional network techniques for handling the data (e.g., network address translation (NAT), etc.). Thus, the connected router may function as the conduit between the Internet and the secondary WAP 112(1) (and its cellular network 120 or other network), while the gateway router 104(2) may continue to perform the traditional techniques for managing the sending and receiving of data from the Internet to the client devices 112.

Further, given that the secondary WAP 112(1) may comprise a device that is mobile within the device environment 102 (e.g., a mobile phone), the router connected to the secondary WAP 112(1) may determine when the strength or quality of the connection to the secondary WAP 112(1) drops below a threshold value. In response to the strength or quality of the connection dropping below a threshold value, the connected router may send an instruction to other routers in the mesh network 110 to scan for the secondary WAP 112(1). Upon or more wireless routers identifying the secondary WAP 112(1) and corresponding signal strength, the gateway router 104(2) (or another of the routers) may determine whether to cause a router other than the currently connected router to establish a connection with the secondary WAP 112(1). For instance, the gateway router 104(2) may determine whether different router measures a strength or quality of a signal of the secondary WAP 112(1) that is greater than a strength or quality of the secondary WAP 112(1) measured by the currently connected router. If so, then the currently connected router may terminate the connection with the secondary WAP 112(1) and the router measuring the stronger or higher quality connection may establish the connection with the secondary WAP 112(1). If this router is a leaf node, then the gateway router 104(2) may tear down the previously created network tunnel (if in existence) and create a new network tunnel with the newly connected wireless router. If the newly connected router is the gateway router 104(2), the gateway router 104(2) may tear down the previously created network tunnel. Finally, if the previously connected router was the gateway router 104(2), then the gateway router 104(2) may establish a connection between itself and the router that has established the connection with the secondary WAP 112(1). This connection may allow data received from the Internet to be received at the connected router before being sent to the gateway router, which may in turn send the data along to the appropriate client device. Conversely, when the client device sends outgoing data, the device may send the data to the gateway router, which may send the data to the connected router, which may send the data to the secondary WAP that finally sends the data to the destination address of the data.

Further, while the above example describes a single secondary WAP 112(1), in other instances a user may have configured multiple secondary WAPs. In these instances, upon the routers scanning for available WAPs, the gateway router 104(2) (or another router) may access stored priority data to determine which secondary WAP to connect to. For instance, the gateway router 104(2) may determine whether a secondary WAP with a highest priority is available and, if so, may establish a connection with this secondary WAP. If not, then gateway router 104(2) may determine whether a secondary WAP with a second-highest priority is available, and so forth. Further, in other instances, the gateway router 104(2) may take into account data in addition to the priority data to determine which secondary WAP to connect to, such as the signal strength, network speed available on each network, and so forth.

Further, after establishing a connection with the secondary WAP 112(1), the routers 104 of the mesh network 110 may detect if and when the connection with the ISP 114 becomes available again. Upon detecting the connection becoming available, the gateway router 104(2) may disconnect from the secondary WAP 112(1) (or send an instruction to the connected leaf node to disconnect) and reestablish the connection with the ISP 114.

Figure 2:
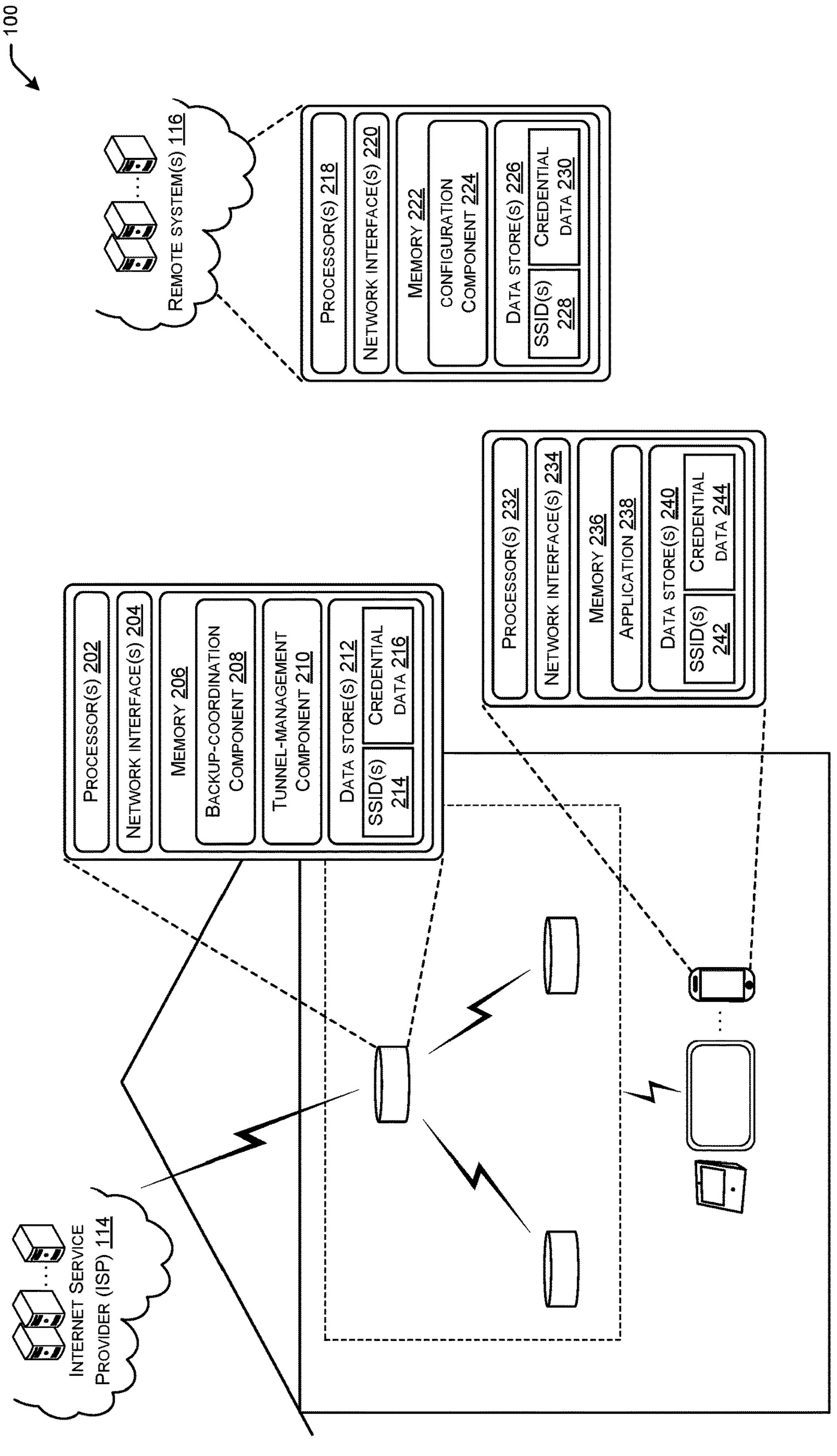
FIG. 2 illustrates example components of the wireless routers, an electronic device configured to function as a secondary WAP, and a remote system for configuring the device to function as the secondary WAP. These components enable the system to transition from utilizing the ISP to utilizing the secondary WAP in the event of the ISP becoming unavailable.

FIG. 2 illustrates example components of the devices of FIG. 1. These components enable the system to transition from utilizing the ISP 114 or another network provider to utilizing the secondary WAP 112(1) (or other secondary WAP) in the event of the ISP 114 or other network provider becoming unavailable.

For instance, FIG. 1 illustrates that the example wireless router 104 includes one or more processors 202, one or more network interfaces 204, and memory 206. The processor(s) 202 may comprise physical hardware processors, each having one or more processing cores. The memory 206 may store a backup-coordination component 208, a tunnel management component 210, and one or more data stores 212, amongst other software and/or firmware, such as an operating system, other client applications, and the like. As illustrated, the data stores may store one or more SSIDs 214 and corresponding credential data 216, each associated with a secondary WAP. For instance, the data store 212 may store a first SSID and corresponding credential data (e.g., password data) for connecting to a first secondary WAP, a second SSID and corresponding credential data (e.g., password data) for connecting to a second secondary WAP, and so forth.

As introduced above, each wireless router 104 may receive the SSID/credential data for each configured secondary WAP from the remote system 116 upon a user requesting to associate the secondary WAP with an account associated with the user and, thus, the device environment 102 and/or mesh network 110. That is, upon the user interacting with the remote system 116 to configure one or more secondary WAPs with the account of the user, the remote system 116 may send the SSID and credential data for each of these secondary WAPs to each of the wireless routers 104, which may store this data in the data stores 212 for connecting to a secondary WAP in the event of the ISP 114 becoming unavailable. Further, the data stores 212 may store priority data indicating the respective priority of each secondary WAP, which may be used in determining an order in which to attempt to connect to the secondary WAPs.

For instance, the backup-coordination component 208 may function to determine when and how to connect to a secondary WAP. For instance, the backup coordination component 208 may initially store the SSID/credential data pairs in the data store 212 upon receiving this data from the remote system 116 or directly from a client device. Thereafter, the backup-coordination component 208 may detect when a connection with the ISP 114 has become unavailable and, in response, may begin the process for establishing a connection with a secondary WAP. For instance, the backup-coordination component 208 may begin scanning for WAPs available in the environment and may also, in some instances, send an instruction to the other wireless routers of the mesh network 110 to do the same. Further, the backup-coordination component 208 operating on the gateway router 104(2) may receive the SSIDs of any available WAPs from the other router(s) and, along with the SSIDs of the available WAPs the gateway router detected, may determine if any secondary WAPs are available for connection. For instance, the backup-coordination component 208 may determine whether a secondary WAP associated with a highest priority is available and, if so, may begin the process for establishing a connection with this secondary WAP. If the highest-priority secondary WAP is not available, the backup-coordination component 208 may determine whether a second highest-priority secondary WAP is available, and so forth.

Upon determining a secondary WAP to which a connection is to be established, the backup-coordination component 208 on the gateway router 104(2) may determine which wireless router of the mesh network 110 has the strongest connection to the secondary WAP and may instruct that router to establish the connection. That router, whether it be the gateway router or a leaf node, may use the credential data (e.g., password data) to establish the connection. If the router that establishes the connection with the secondary WAP is a leaf node, meanwhile, the tunnel-management component 210 operating on the gateway router 104(2) may create a network tunnel between the gateway router 104(2) and the connected leaf node for routing data between the network to which the secondary WAP connects and the gateway router 104(2) via the connected leaf node, as described above.

The remote system 116, meanwhile, may include one or more processors 218, one or more network interfaces 220, and memory 222. In addition to other software and/or firmware, the memory 222 may store a configuration component 224 and data stores 226. As illustrated, the data stores 226 may store one or more SSIDs 228 and corresponding credential data 230, each associated with a secondary WAP. For instance, the data store 226 may store a first SSID and corresponding credential data (e.g., password data) for connecting to a first secondary WAP, a second SSID and corresponding credential data (e.g., password data) for connecting to a second secondary WAP, and so forth.

For instance, a user may interact with the remote system via an application, website, or other interface provided by the configuration component 224 in order to provide, to the remote system 116, information regarding the secondary WAPs. For instance, a user may operate an application provided by the remote system 116 to provide an SSID and credential data (e.g. password) for a first secondary WAP, an SSID and credential data for a second secondary WAP, and so forth. The user may also use the application to provide priority data indicating which secondary WAP has a highest priority, which has a second highest priority and so forth.

In addition, FIG. 2 illustrates that a device configured to operate as a secondary WAP may include one or more processors 232, one or more network interfaces 234, and memory 236 storing an application 238 and a data store 240, which may store SSID(s) 242 and credential data 244 for one or more devices configured to operate as secondary WAPs. It is to be appreciated that while FIG. 2 illustrates the secondary WAP 112(1) as a client device, in some instances the secondary WAP is not a client device. Further, while this figure also illustrates that the user may use the application 238 stored on the secondary WAP/client device to interact with the remote system 116, in other instances the user may use an application stored on another client device. Regardless of which device the user utilizes, a user may use the application or other interface component to provide, to the remote system 116, the information regarding the secondary WAPs, such as the SSIDs, credential data, priority data, and so forth. Further, while the user may provide this information to the remote system 116 directly in some instances, in other instances the application 238 may send this information directly to a wireless router of the mesh network 110, such as in the example where the connection to the ISP 114 or other network provider has become unavailable and the user has not yet set up a secondary WAP.

Figure 3:
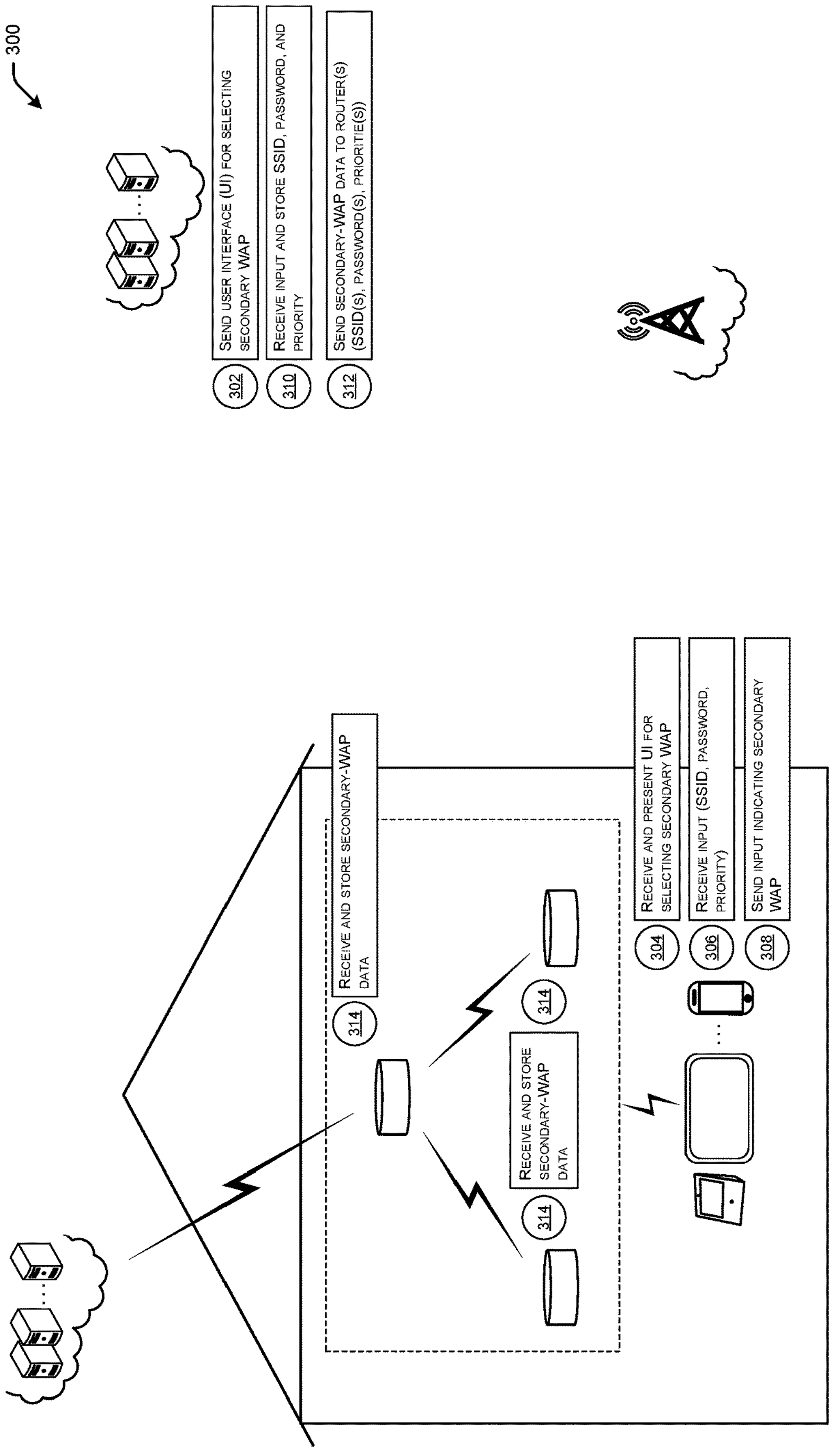
FIG. 3 illustrates an example process within the example architecture of FIG. 1 for configuring a secondary WAP within the system. As illustrated, the remote system interacts with an application executing on a client electronic device to allow a user to provide data for using the same or a different electronic device as a secondary WAP.

FIG. 3 illustrates an example process 300 configuring a secondary WAP prior to an ISP 114 or another network provider becoming unavailable. As illustrated, in this example the remote system 116 interacts with an application 238 executing on a client electronic device to allow a user to provide data for using the same or a different electronic device as a secondary WAP. The process 300 and other processes described herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Finally, while some of the operations are described as being performed by certain devices or components in these examples, it is to be appreciated that other devices and components may perform some or all of these operations in other instances.

An operation 302 represents the remote system 116 sending, to a client device, user-interface data for presenting a user interface (UI) to a user that allows the user to provide data associated with a secondary WAP. For instance, the UI may allow the user to specify, via user-input data, an SSID associated with a device that is to operate as a secondary WAP, credential data associated with this device, and a priority of this secondary WAP relative to other secondary WAPs. The application may also allow the user to specify multiple secondary WAPs and their relative priorities.

An operation 304 represents a client device receiving and presenting the UI of the application. An operation 306 represents receiving an input from the user, such as an input specifying one or more SSIDs, corresponding credential data, and corresponding priority data. An operation 308 represents send this data associated with the secondary WAP to the remote system 116, which receives and stores this data at an operation 310. At an operation 312, the remote system 116 sends this secondary-WAP data to one more wireless routers of the mesh network 110 associated with an account of the user. For instance, the remote system 116 may send this data to the gateway router and each leaf node, or may send this information to a single router (e.g., the gateway router) with an instruction to send this data to each other router of the mesh network 110.

At an operation 314, each router in the mesh network 110 stores this data in its respective data stores. This information may be used by each wireless router when attempting to detect and connect with a secondary WAP after an ISP or other primary network provider becomes unavailable in the device environment 102.

FIGS. 4A-D collectively illustrates an example process 400 within the example architecture of FIG. 1 for determining that an ISP or other network provider has become unavailable and transitioning to using the secondary WAP such that the devices within the device environment maintain connection to the Internet or other network. At an operation 402, the gateway router 104(2) or another router of the mesh network 110 detects the failure of a network connection with the ISP 114 or other primary network provider. At an operation 404, the gateway router 104(2) sends, to each leaf node in the wireless mesh network, instruction data representing an instruction to scan for available wireless networks in the environment. An operation 406 represents each leaf node in the mesh network 110 receiving the instruction and, at an operation 408, beginning to scan for available wireless networks in the environment.

Figure 4A:
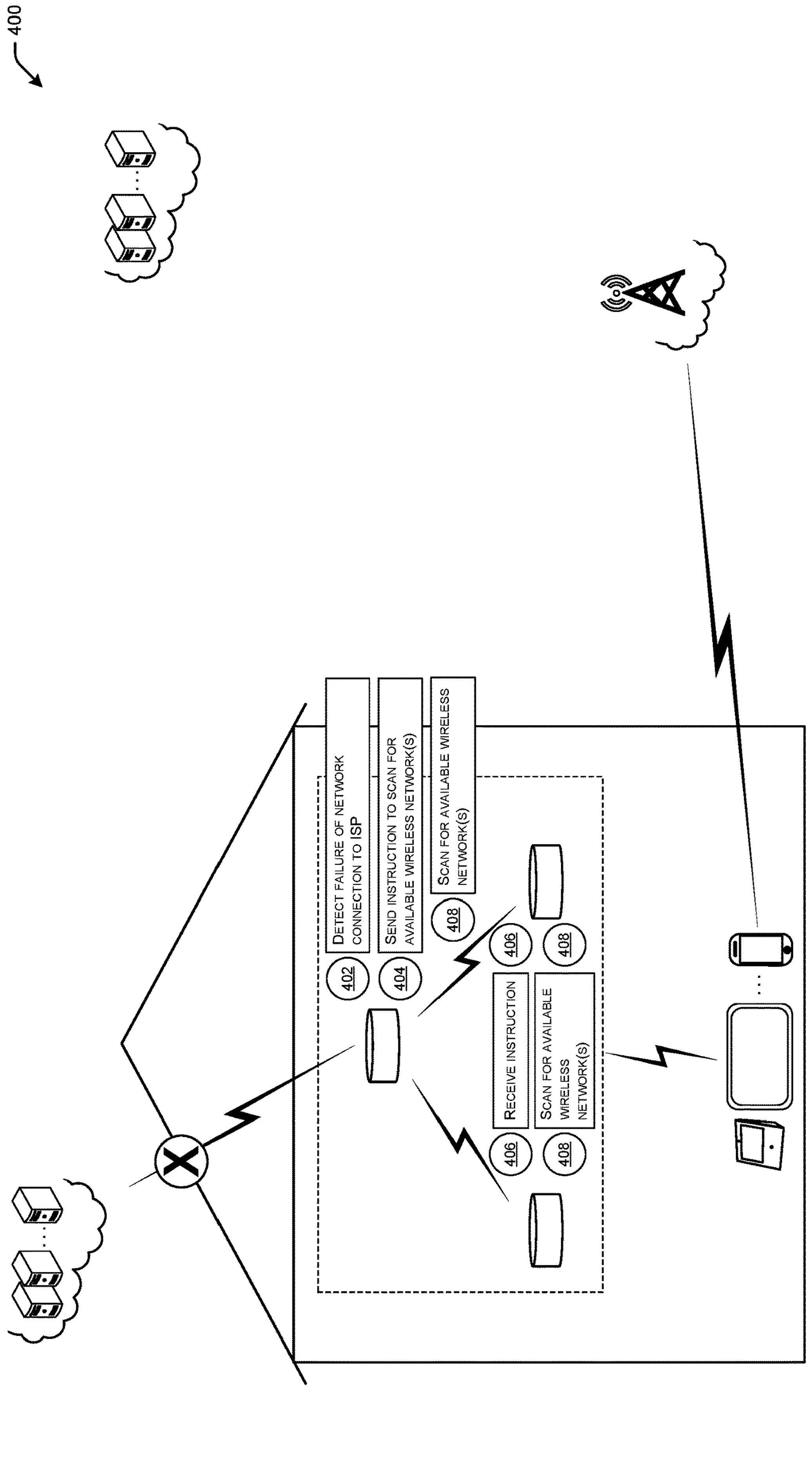
FIGS. 4A-D collectively illustrates an example process within the example architecture of FIG. 1 for determining that a connection with an ISP has become unavailable and transitioning to using the secondary WAP such that the devices within the device environment maintain connection to the Internet or other network.
Figure 4B:
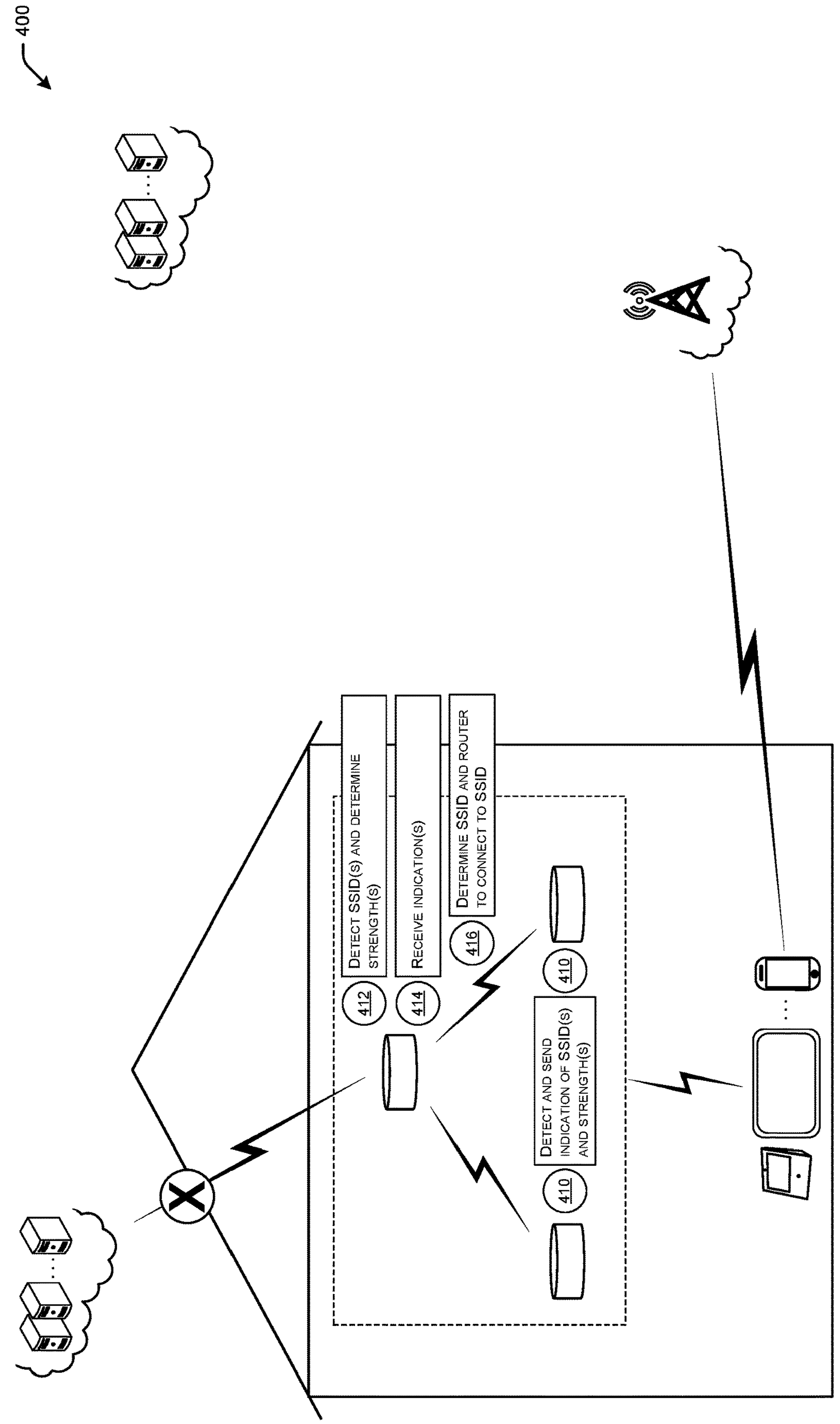

FIG. 4B continues the illustration of the process 400 and includes, at an operation 410, one or more of the leaf nodes detect available WAPs and sending an indication of the SSIDs of these available WAPs, respective signal strength and/or quality, and respective channel data to the gateway router 104(2). An operation 412 represents the gateway router 104(2) also detecting one or more available WAPs, respective signal strength and/or quality, and respective channel data. At an operation 414, the gateway router 104(2) receives the indications from the leaf nodes and, at an operation 416, determines an WAP to which to attempt to connect to and a corresponding router that is to attempt to connect to this WAP. For instance, the gateway router 104(2) may use the stored priority data to determine whether a highest priority data has been identified as being available and, if so, may WAP a router having a highest signal strength and/or quality as the router that is to attempt to connect to this WAP. If this highest-priority secondary WAP is not available, then the gateway router 104(2) may determine whether next highest-priority is available, and so forth. Further, while this example describes selecting the SSID/secondary WAP based on the priority data, in other instances the gateway router may take into account the priority data in addition to other data, such as signal strength, quality, and the like.

Figure 4C:
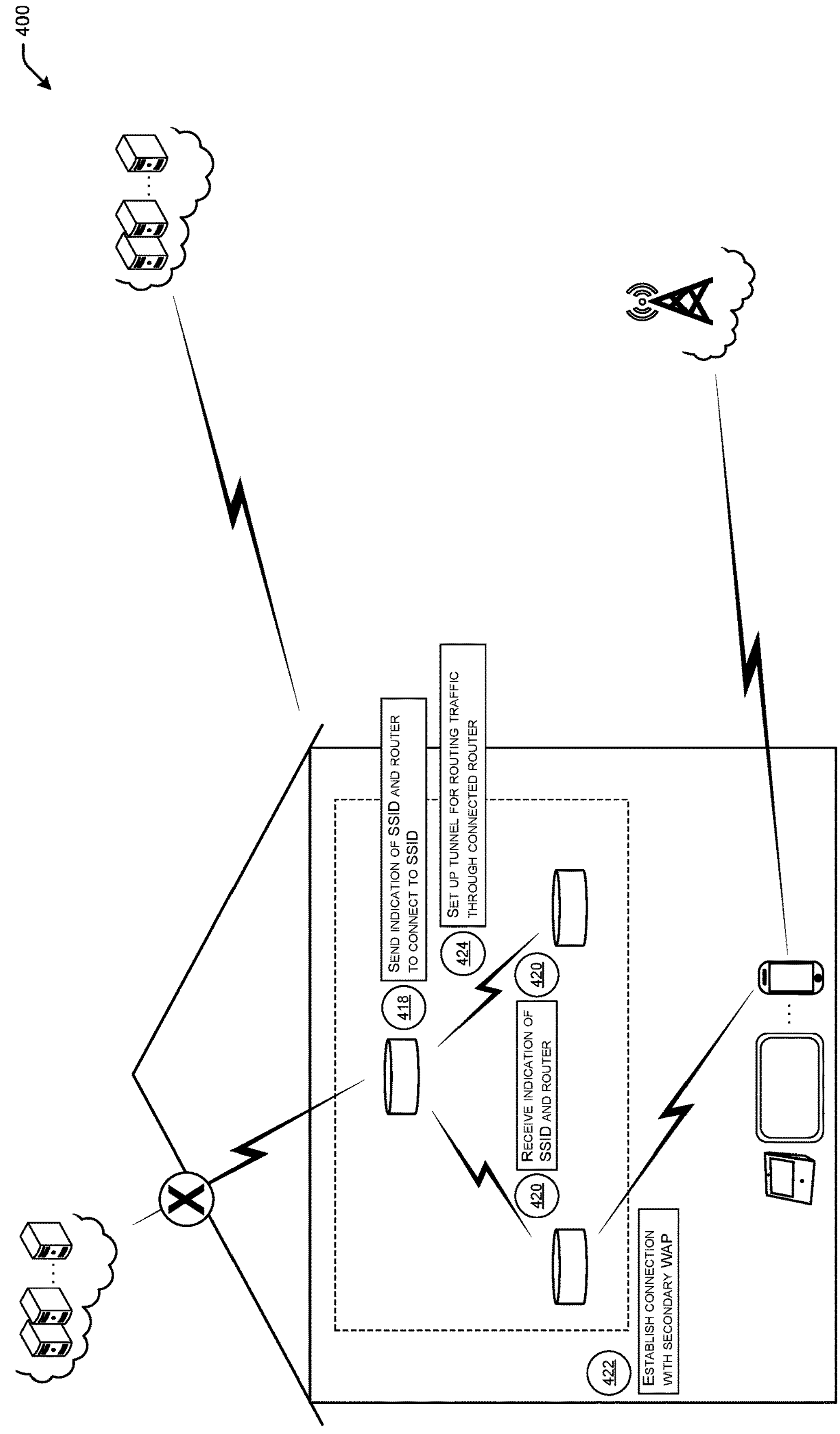

FIG. 4C continues the illustration of the process 400 and includes, at an operation 418, sending, to one or more routers of the mesh network 110, an indication of the selected SSID/secondary WAP and the router that is to attempt to connect to this secondary WAP. In some instances, the gateway router 104(2) may send this information to the router that has been selected to connect to the secondary WAP while not sending this information to the other routers of the mesh network 110. Further, the gateway router 104(2) may not send this indication in response to determining that it is the router that is to connect to the secondary WAP.

At an operation 420, one or more of the routers receive the indication of the SSID and the selected router and, in this example, the router 104(N) establishes a connection with the identified SSID/secondary WAP at an operation 422. At an operation 424, the gateway router 104(2) sets up a network tunnel between itself and the router 104(N) that is connected to the secondary WAP. The gateway router 104(2) may also store an indication that network data is now to be routed to an interface that is associated with this newly created tunnel.

Figure 4D:
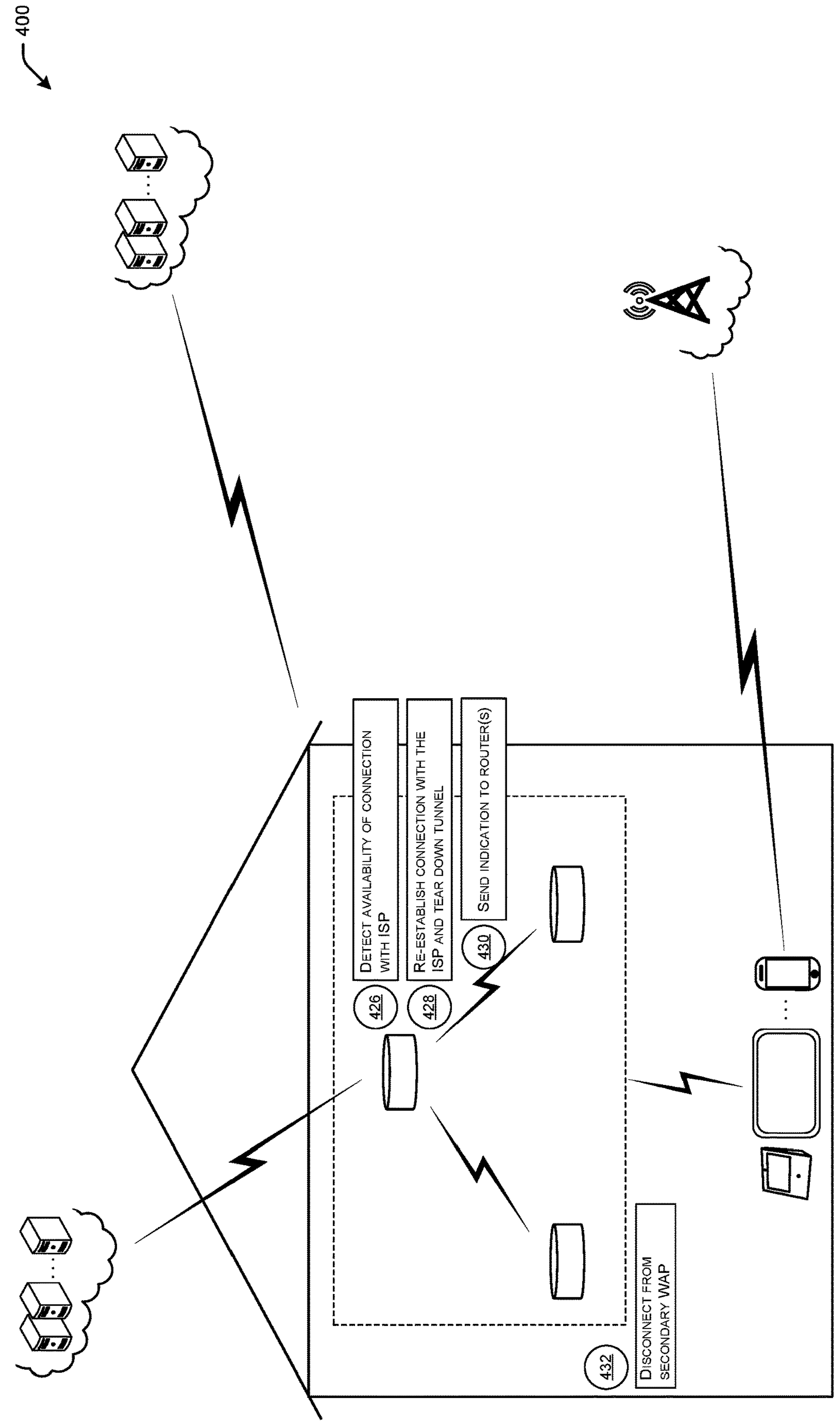

FIG. 4D concludes the illustration of the process 400 and includes, at an operation 426, the gateway router 104(2), or another router, detecting the availability of the ISP or other primary network provider. At an operation 428, the gateway router 104(2) reestablishes a network connection with the ISP 114 and tears down the network tunnel between the gateway router 104(2) and the router 104(N) previously connected to the secondary WAP 112(1). At an operation 430, the gateway router 104(2) sends an indication of this network connection to at least the connected router 104(N). For instance, the gateway router 104(2) may send, to the router 104(N), an instruction to disconnect from the secondary WAP 112(1). At an operation 432, the connected router 104(N) receives the indication and disconnects from the secondary WAP 112(1). That is, the connected router 104(N) may terminate the wireless connection with the secondary WAP in response to receiving the instruction.

FIGS. 5A-E collectively illustrates another example process 500 that includes the ISP 114 or other primary network provider becoming unavailable, and a user thereafter configuring an electronic device to function as a secondary WAP such that that the devices within the device environment maintain connection to the Internet or other network. At an operation 502, the gateway router 104(2) or another router of the mesh network 110 detects the failure of a network connection with the ISP 114 or other primary network provider. An operation 504 represents a client device presenting a UI of an application for selecting a device to function as a secondary WAP. An operation 506 represents receiving a user-input data based on input from the user, such as an input specifying one or more SSIDs and corresponding credential data, and sending a request for connecting to this secondary WAP to the gateway router 104(2). An operation 508 represents receiving this request and indication of the secondary WAP at the gateway router 104(2).

Figure 5A:
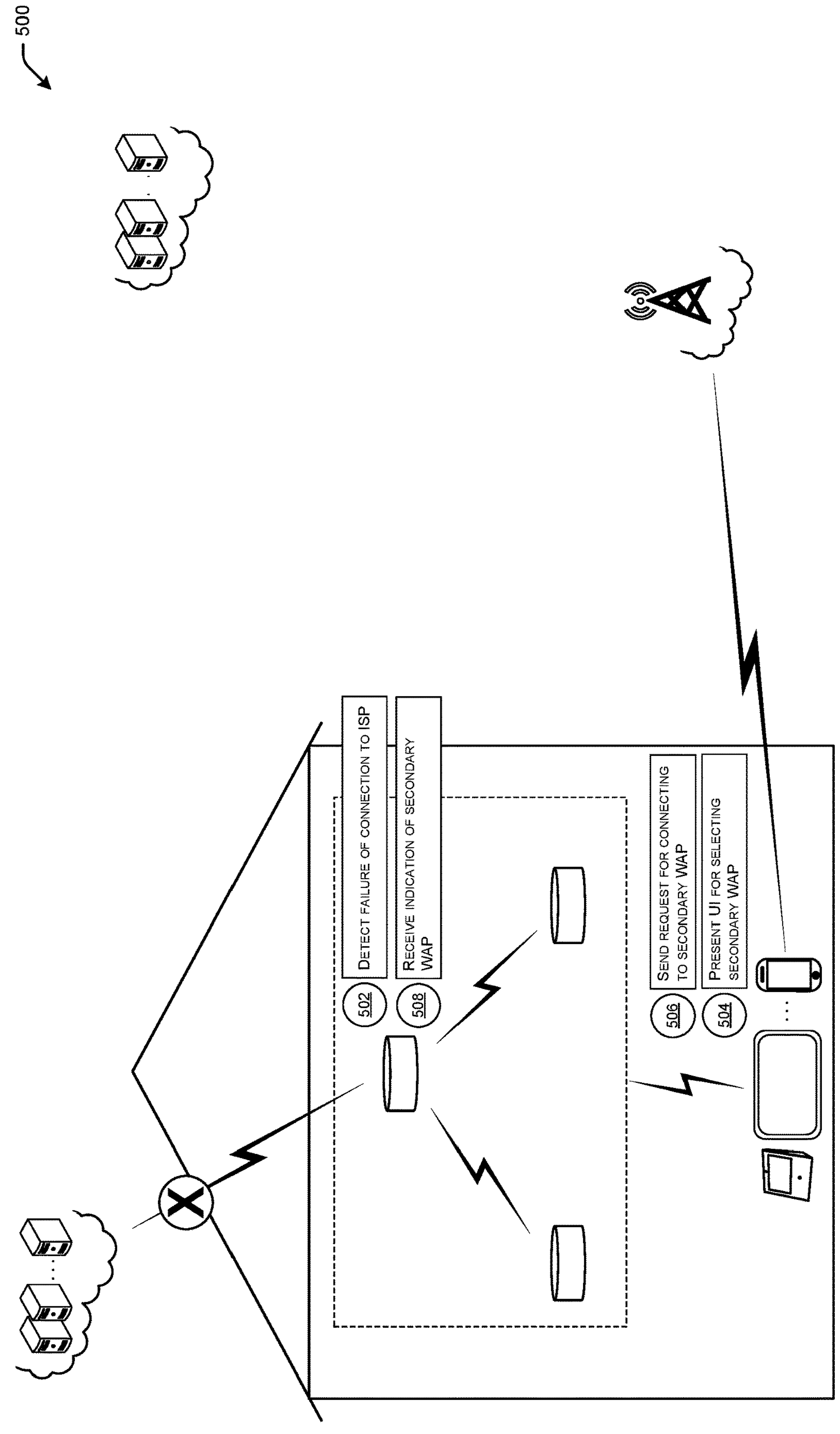
FIGS. 5A-E collectively illustrates another example process that includes the ISP becoming unavailable, and a user thereafter configuring an electronic device to function as a secondary WAP such that that the devices within the device environment maintain connection to the Internet or other network.
Figure 5B:
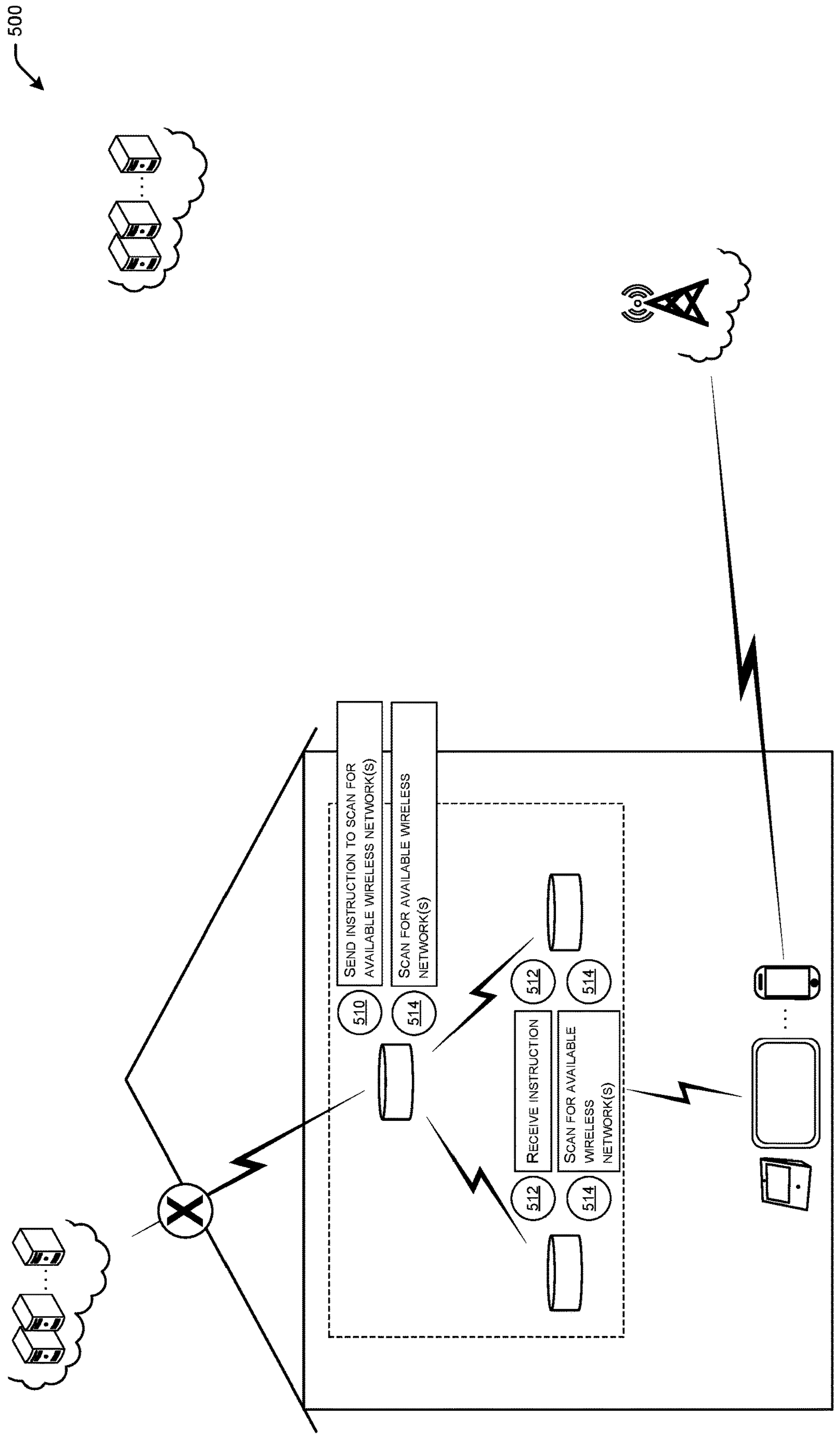

FIG. 5B continues the illustration of the process 500 and includes, at an operation 510, the gateway router 104(2) sending, to each leaf node in the mesh network 110, instruction data representing an instruction to scan for available wireless networks in the environment. An operation 512 represents each leaf node in the mesh network 110 receiving the instruction and, at an operation 514, beginning to scan for available wireless networks in the environment. The operation 514 represents the gateway router 104(2) also scanning for available wireless networks.

Figure 5C:
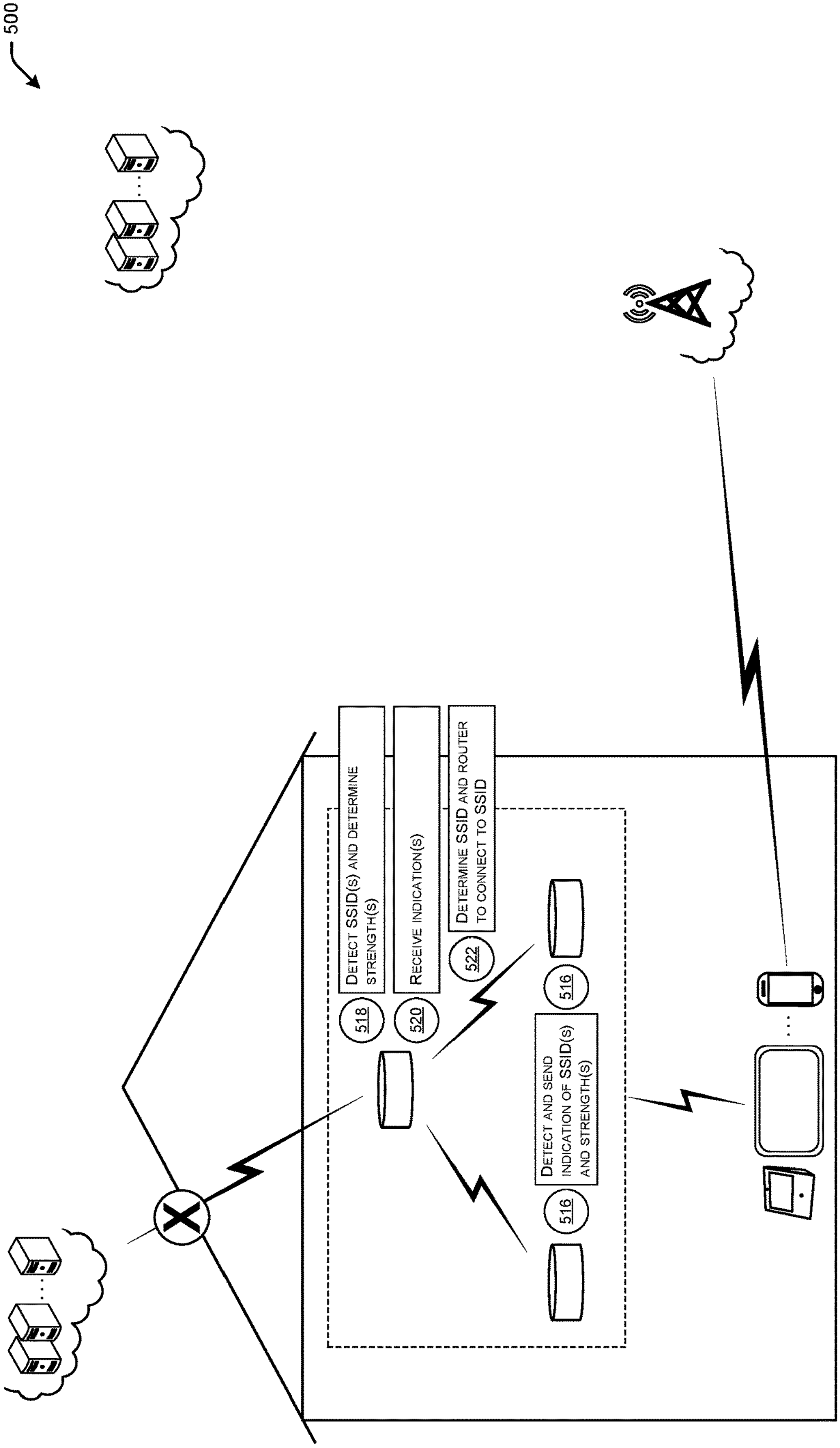

FIG. 5C continues the illustration and includes, at an operation 516, one or more of the leaf nodes detecting available WAPs and sending an indication of the corresponding SSIDs, respective signal strength and/or quality, and respective channel data to the gateway router 104(2). An operation 518 represents the gateway router 104(2) also detecting one or more available WAPs, respective signal strength and/or quality, and respective channel data. At an operation 520, the gateway router 104(2) receives the indications from the leaf nodes and, at an operation 522, determines a WAP to which to attempt to connect to and a corresponding router that is to attempt to connect to this WAP. For instance, if the user provided multiple possible secondary WAPs and corresponding priorities, the gateway router 104(2) may use the stored priority data to determine whether a highest priority data has been identified as being available and, if so, may select a router having a highest signal strength and/or signal quality as the router that is to attempt to connect to this WAP. If this highest-priority secondary WAP is not available, then the gateway router 104(2) may determine whether next highest-priority is available, and so forth. Further, while this example describes selecting the SSID/secondary WAP based on the priority data, in other instances the gateway router may take into account the priority data in addition to other data, such as signal strength, signal quality, and the like.

Figure 5D:
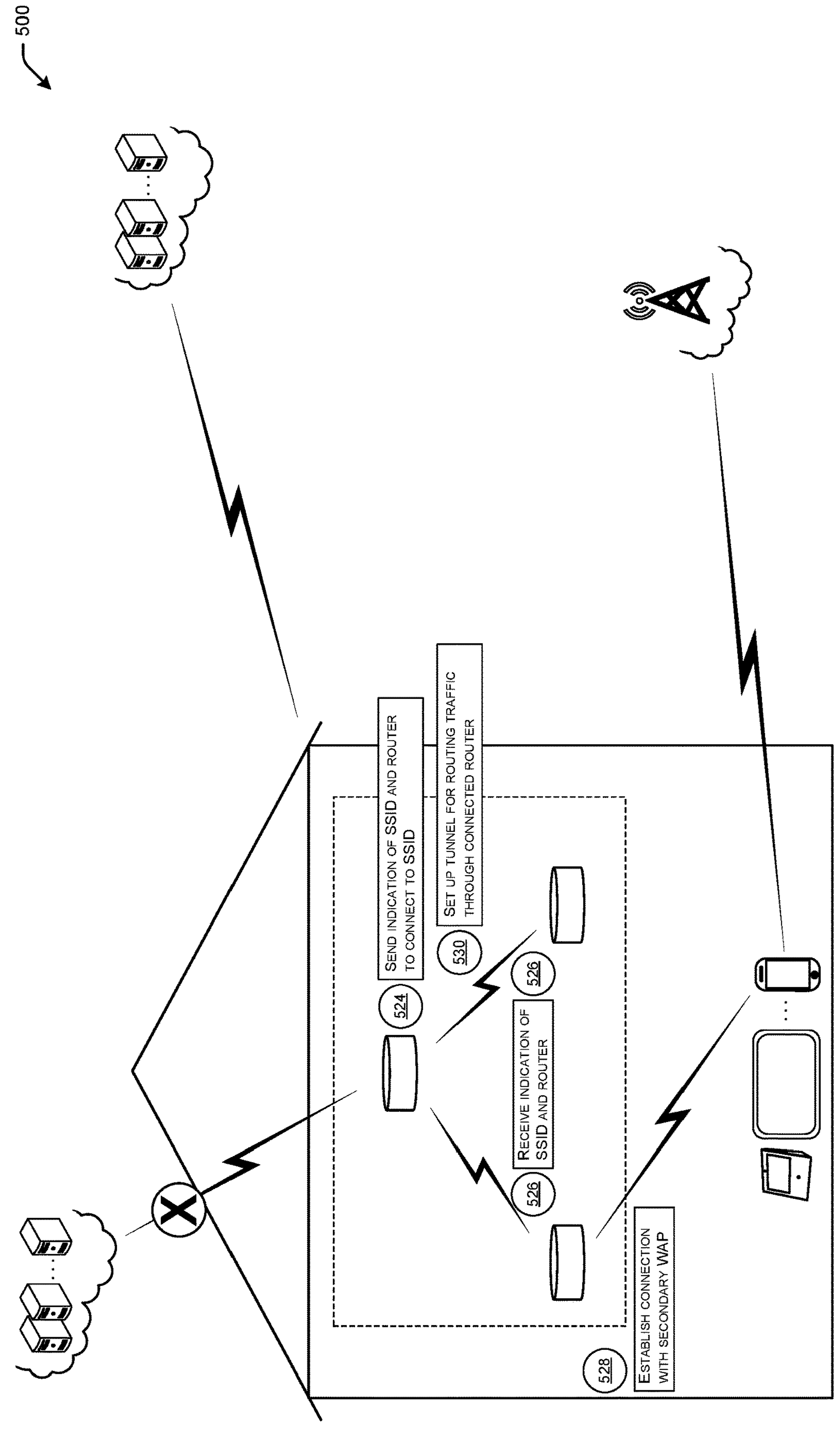

FIG. 5D continues the illustration of the process 500 and includes, at an operation 524, sending, to one or more routers of the mesh network 110, an indication of the selected SSID/secondary WAP and the router that is to attempt to connect to this secondary WAP. In some instances, the gateway router 104(2) may send this information to the router that has been selected to connect to the secondary WAP while not sending this information to the other routers of the mesh network 110. Further, the gateway router 104(2) may not send this indication in response to determining that it is the router that is to connect to the secondary WAP.

At an operation 526, one or more of the routers receive the indication of the SSID and the selected router and, in this example, the router 104(N) establishes a connection with the identified SSID/secondary WAP at an operation 528. At an operation 530, the gateway router 104(2) sets up a network tunnel between itself and the router 104(N) that is connected to the secondary WAP. The gateway router 104(2) may also store an indication that network data is now to be routed to an interface that is associated with this newly created tunnel.

Figure 5E:
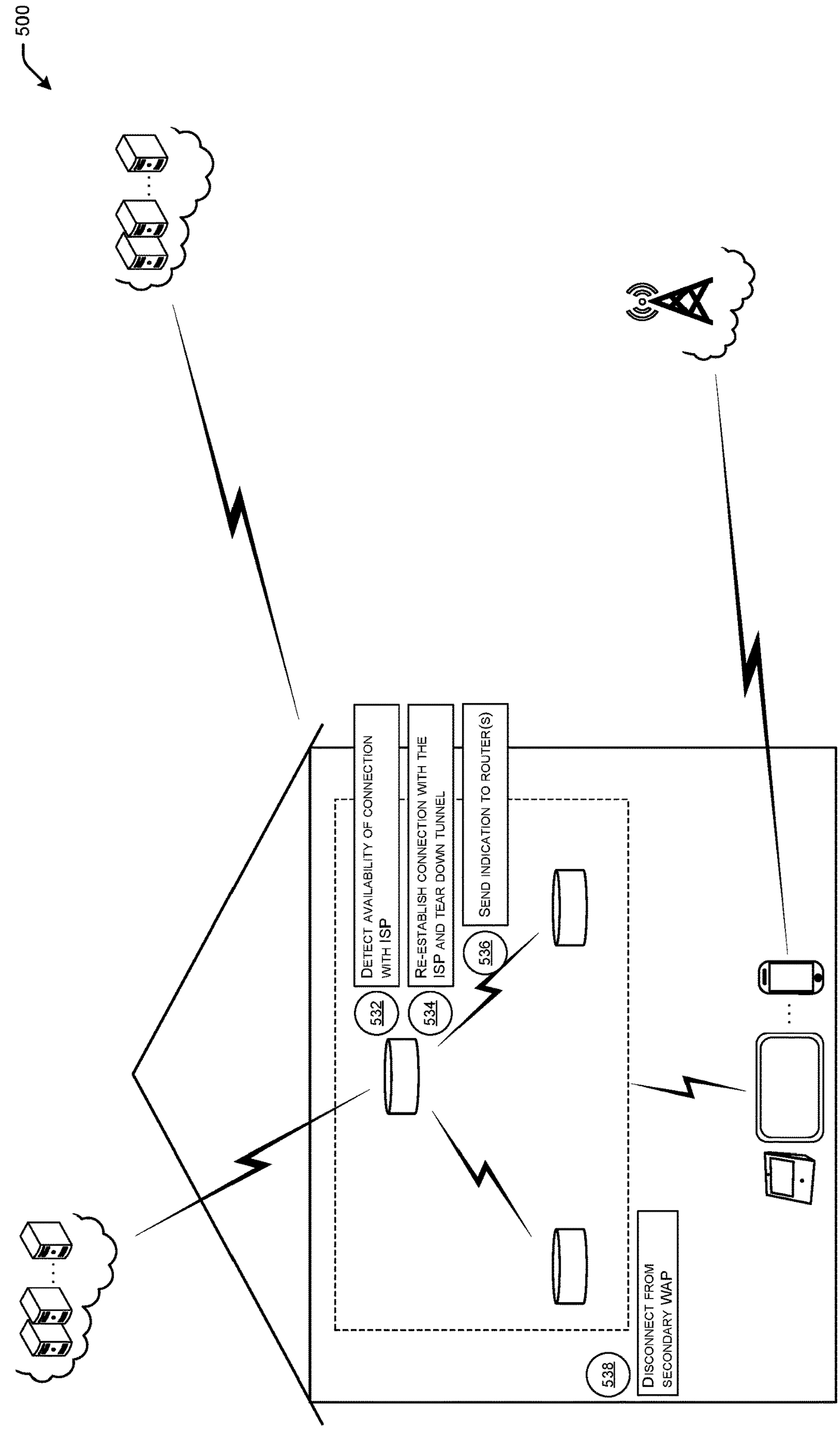

FIG. 5E concludes the illustration of the process 500 and includes, at an operation 532, the gateway router 104(2), or another router, detecting the availability of the ISP or other primary network provider. At an operation 534, the gateway router 104(2) reestablishes a network connection with the ISP 114 and tears down the network tunnel between the gateway router 104(2) and the router 104(N) previously connected to the secondary WAP 112(1). At an operation 536, the gateway router 104(2) sends an indication of this network connection to at least the connected router 104(N). For instance, the gateway router 104(2) may send, to the router 104(N), an instruction to disconnect from the secondary WAP 112(1). At an operation 538, the connected router 104(N) receives the indication and disconnects from the secondary WAP 112(1).

Figure 6:
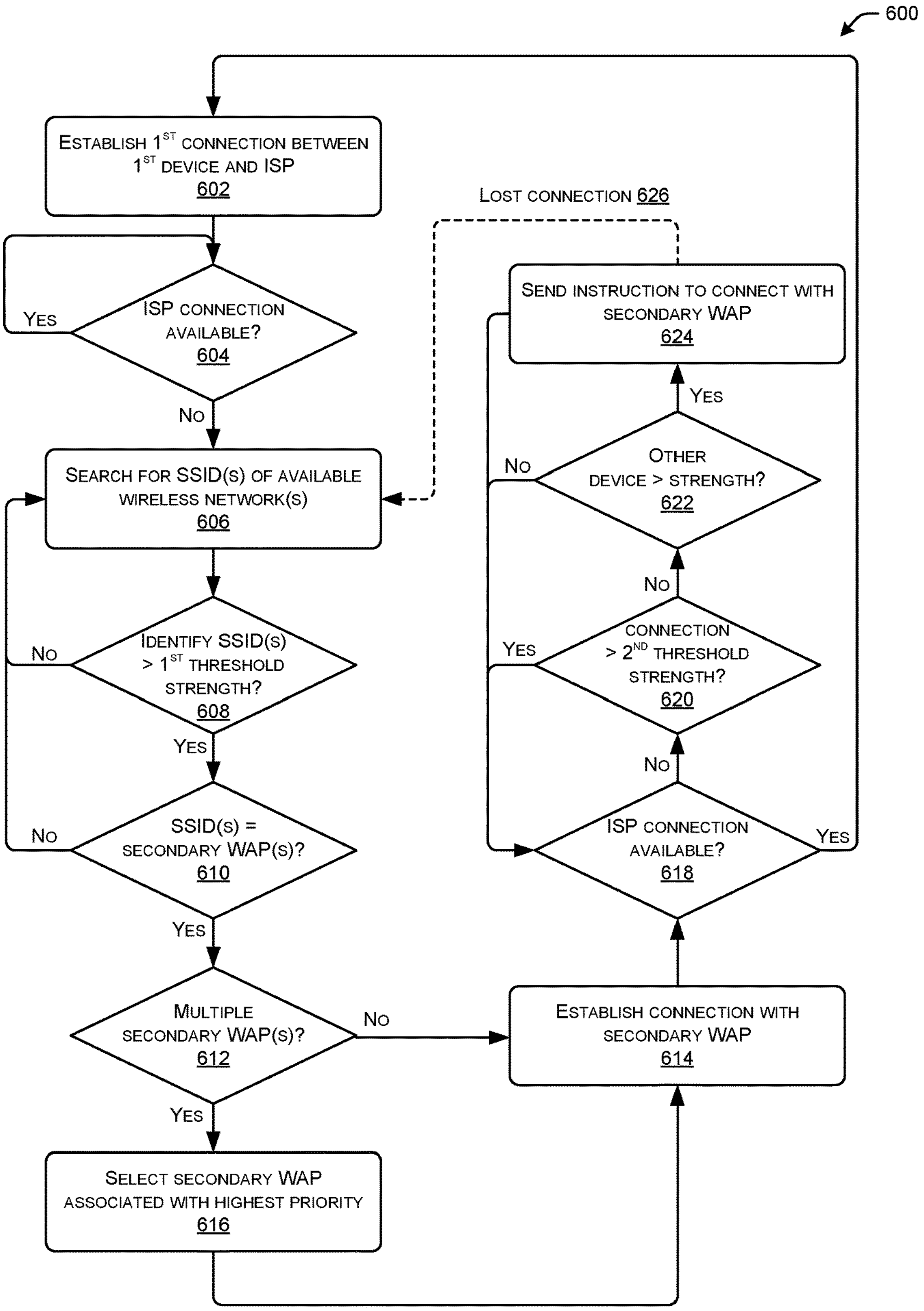
FIG. 6 illustrates a flow diagram of an example process for determining that a connection to an ISP has become unavailable and transitioning to using the secondary WAP such that the devices within the device environment maintain connection to the Internet or other network.

FIG. 6 illustrates a flow diagram of an example process 600 for determining that an ISP or other primary network provider has become unavailable and transitioning to using the secondary WAP such that the devices within the device environment maintain connection to the Internet or other network. In some instances, this process can be implemented by a gateway router of a wireless mesh network, a leaf node of the wireless mesh network, one or more server computing devices of a remote system, a combination thereof, and/or the like.

An operation 602 represents establishing a first network connection between a gateway router and an ISP or other network provider. This connection may comprise a physical connection or a wireless connection. An operation 604 represents determining if the ISP connection remains available. That is, this operation may comprise determining whether the gateway router is able to send data to and receive data from the Internet or other external network via the ISP. If so, the gateway router remains connected to the ISP, and network data may flow between the client devices in the environment, the leaf nodes in the environment, the gateway router, and the ISP.

If, however, the ISP connection is not available, then an operation 606 represents searching for WAP(s) in the environment. As will be appreciated, the ISP connection may become unavailable for any number of reasons, such as termination of the connection between the gateway router and an ISP modem (e.g., because a physical cable is unplugged), an ISP server experiencing a failure, a malfunction occurring at the ISP modem or the gateway router, and/or the like. If this ISP connection becomes unavailable, then searching for WAPs in the environment may include the gateway router and/or the leaf nodes scanning the environment for available WAPs. An operation 608 represents determining whether one or more routers have identified at least one WAP with a signal strength and/or quality that meets a threshold. If not, the router(s) continue to search for available WAPs. If at least one WAP with a threshold signal strength and/or quality is identified, however, then an operation 610 represents determining whether any of the WAPs correspond to an SSID that has been stored as a secondary WAP. That is, this operation comprises determining whether one or more of the SSIDs of the detected WAPs have been previously stored (e.g., based on user input) as corresponding to a secondary WAP to be used upon the ISP becoming unavailable. If not, then the router(s) continue to search for available WAPs.

If, however, one of the available WAPs does correspond to a secondary WAP, then an operation 612 represents determining whether there are multiple WAPs that have been identified as having the threshold signal strength and/or quality and that have been configured as a secondary WAP. If not, meaning a single secondary WAP has been identified, then an operation 614 represents establishing a wireless network connection with the secondary WAP. As noted above, this may include determining which router of the wireless mesh network has measured the strongest or highest-quality signal with the SSID corresponding to the secondary WAP and causing that router to establish the connection.

If, however, there are multiple WAPs that have been identified as having the threshold signal strength and/or quality and that have been configured as a secondary WAP, then an operation 616 represents selecting the secondary WAP associated with a highest priority and then establishing the connection with this selected secondary WAP at the operation 614. For instance, the backup-coordination component 208 of the gateway router may access stored priority data to determine which of the identified WAPs is associated with the highest priority. Further, in other instances the gateway router, the remote system, or another component may select the secondary WAP in any other manner, such as with reference to the signal-strength and/or signal-quality data in addition to the priority data, or the like.

An operation 618 represents determining whether the ISP connection is available. That is, this operation 618 represents determining whether a wireless router within the environment is able to re-establish a connection with the ISP for providing network connectivity to other routers and/or client devices in the environment. If so, the process 600 disconnects from the secondary WAP and proceeds back to the operation 602 to re-establish a connection with the ISP. If not, an operation 620 represents determining whether a connection strength and/or quality between the secondary WAP and the router connected to the secondary WAP is greater than a second threshold value, which may be less than the first threshold determined at the operation 608. If the connection strength and/or quality is above the second threshold value, the router continues to remain connected to the secondary WAP and no further action is taken. If, however, the connection strength and/or quality has fallen below the second threshold value, then an operation 622 represents determining whether another router of the wireless mesh network has a higher connection strength and/or quality to the secondary WAP. For instance, given the secondary WAP may comprise a mobile device that moves within the environment, the respective connection strengths between the routers and the secondary WAP may vary. If it is determined that another router has a stronger or higher-quality connection than the router currently connected to the secondary WAP, then an operation 624 represents sending an instruction to the other router having the stronger or higher-quality connection to establish a connection with the secondary WAP. In addition, the previously connected router may terminate its connection with the secondary WAP given that the router with detecting a stronger or higher-quality signal of the secondary WAP is able to establish a connection with the secondary WAP. In this way, the router that connects to the secondary WAP may change as the secondary WAP (e.g., a mobile phone, tablet, etc.) roams within the environment. It is to be appreciated that while the process 600 describes transitioning to the connection to another router if that router has a stronger connection than the currently connected router, in other instances this transition may occur if the connection to the other router is greater than a threshold amount, or the like. Finally, an operation 626 represents that if a connection between a router that was connected to the secondary WAP is lost at any point, the process 600 may proceed back to the operation 606 for searching for available WAPs.

Figure 7A:
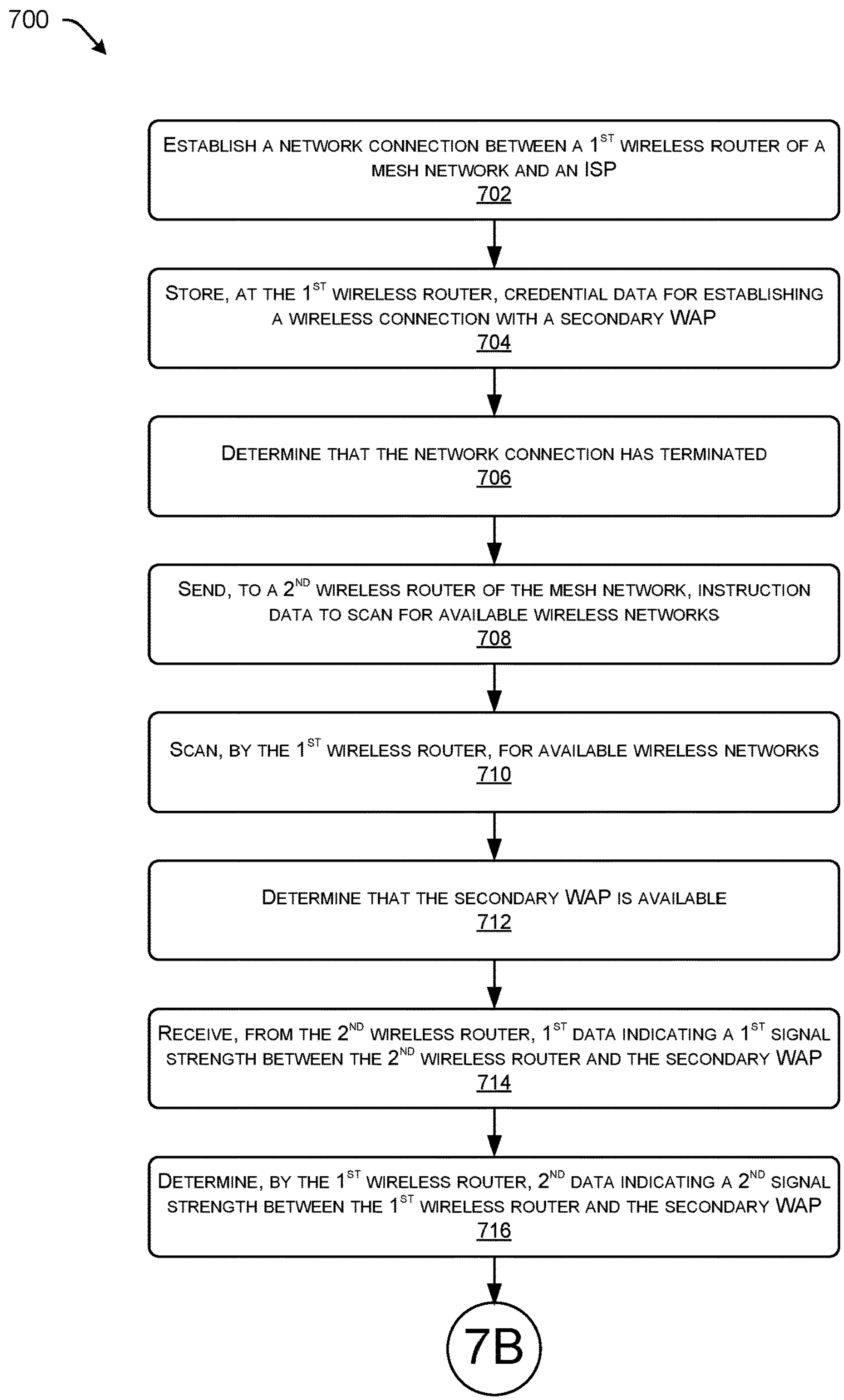
FIGS. 7A-B collectively illustrate a flow diagram of an example process for configuring a secondary WAP, determining that a connection with an ISP has become unavailable, and transitioning to using the secondary WAP such that the devices within the device environment maintain connection to the Internet or other network.
Figure 7B:
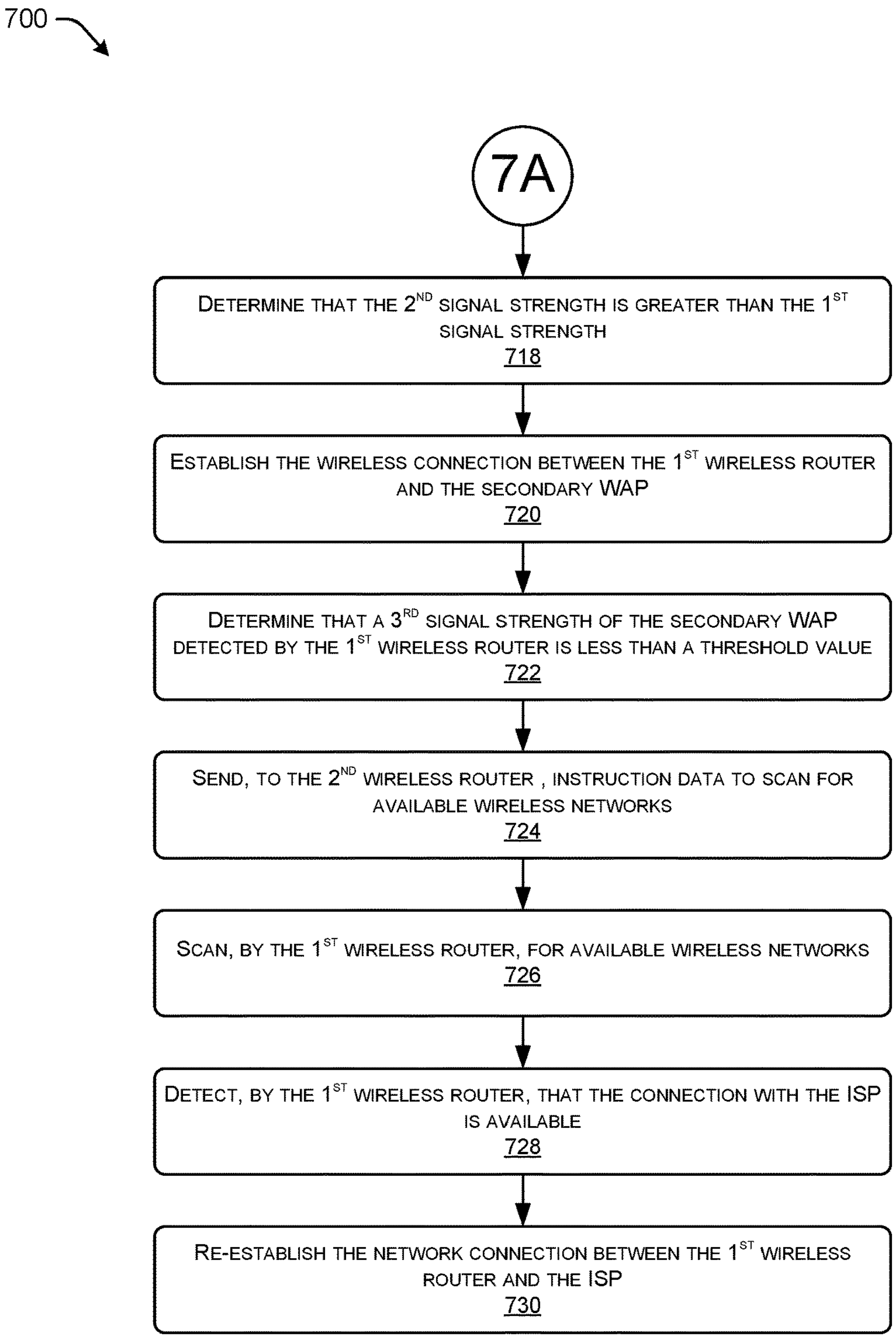

FIGS. 7A-B collectively illustrate a flow diagram of an example process 700 for configuring a secondary WAP, determining that a primary WAP has become unavailable, and transitioning to using the secondary WAP such that the devices within the device environment maintain connection to the Internet or other network.

An operation 702 represents establishing a network connection between the first wireless router and an Internet Service Provider (ISP) server, the first wireless router operating as a primary WAP in an environment of a wireless mesh network that includes at least the first wireless router and a second wireless router. For instance, this operation may comprise the first wireless router establishing a physical connection with a network component of the ISP server.

An operation 704 represents storing, at the first wireless router, credential data for establishing a wireless connection with a secondary WAP at least partly in response to termination of the network connection with the ISP server. For instance, the first wireless router may receive this credential data in response to a user utilizing a user interface of an application for indicating the device that is function as the secondary WAP. In some instances, the first wireless router may receive this information from a service that is remote from the environment, while in other instances the first wireless router may receive this information from a client device operating in the environment of the first wireless router. Thus, the first wireless router may receive this data from the remote service while the primary WAP is available and operating, directly from the client device over a short-range network (e.g., Bluetooth, etc.) while the primary WAP and/or ISP server is not available, and/or a combination thereof. Further, it is to be appreciated that the connection between the first wireless router and the ISP server may terminate for any number of reasons, such as the ISP server experiencing failure, infrastructure between the ISP server and the first wireless router experiencing failure, and/or any other reason related to interrupting a connection between computing devices.

In addition, the credential data may comprise an SSID or other device name, a password for connecting with the device, and/or other information for enabling the first wireless router and other wireless routers of the mesh network to establish a connection with the device upon the primary WAP and/or corresponding ISP server becoming unavailable. Further, and as described above, it is to be appreciated that respective credential data associated with each of multiple devices may be received such that the system has multiple secondary WAPs that it may utilize in response to the first wireless connection being terminated. Further, the first wireless router may receive and store priority data indicating a priority of each of the respective devices, with a highest priority representing an indication that the corresponding device is to act as the first secondary WAP, if available, and so forth. The device, or devices, which have been indicated as secondary WAPs may comprise mobile electronic device configured to configured to wirelessly connect to a cellular network, modem/routers coupled to another wireless network, and/or any other type of electronic device having a network connection that is different from the network connection of the primary WAP.

An operation 706 represents determining that the network connection with the ISP server has terminated. For instance, the first wireless router may determine this directly in response to determining that access to the Internet or other network has been lost, may receive an indication from another wireless router of the mesh network, or the like. Further, it is to be appreciated that determining that a connection is terminated may comprise determining that there is no available connection, or determining that a strength and/or quality of the connection is less than a threshold connection value.

An operation 708 represents sending, to the second wireless router, instruction data representing an instruction to scan for available wireless networks in the environment. For instance, the first wireless router may send this instruction data in response to determining that the network connection has terminated such that the mesh network may begin the process of transitioning to the use of a secondary WAP to maintain network connection for the devices within the environment.

An operation 710 represents scanning, by the first wireless router, for available wireless networks in the environment. This operation may comprise the first wireless router attempting to detect, and output an indication of, one or more SSIDs of WAPs that available and within range of the first wireless router. The second wireless router, and any other wireless routers of the mesh network, may similarly scan the environment for available WAPs. In addition, the first wireless router, and other routers of the mesh network, may also measure and store an indication of a respective signal strength and/or quality (e.g., dBm, RSSI, etc.) of each identified WAP.

An operation 712 represents determining that the secondary WAP, for which the credential data has been stored, is available. This operation may comprise the first wireless router making this determination directly based on the scanning, or the first wireless router receiving, from the second wireless router or another router within the mesh network, an indication that the device that has been designated as the secondary WAP is available.

For example, this operation may comprise determining that the list of available WAPs includes the SSID of the electronic device that has been designated as the secondary WAP. In instances where the system has been configured with multiple secondary WAPs, this operation may comprise identifying multiple devices, each of which have been previously identified as a secondary WAP. The first wireless router, or other router in the mesh network, may then select, as the secondary WAP, the device associated with the highest priority. In other instances, the first wireless router, or other router in the mesh network, may select, as the secondary WAP, the device having the highest signal strength and/or quality to a router within the mesh network. In still other instances, the first wireless router, or other router in the mesh network, may utilize the signal strengths and/or signal qualities, the priority data, and/or additional factors to select a device to act as the secondary WAP.

An operation 714 represents receiving, from the second wireless router, first data indicating a first signal strength and/or quality between the second wireless router and the secondary WAP. For instance, this operation may comprise receiving, from the second wireless router, data indicating an RSSI of the device indicated as the secondary WAP, as measured by the second wireless router. The first wireless router may receive this signal-strength and/or signal-quality data from each other wireless router within the mesh network that also detects this device.

An operation 716 represents determining, by the first wireless router, second data indicating a second signal strength and/or quality between the first wireless router and the secondary WAP. This operation may similarly comprise the first wireless router measuring and storing an RSSI of the device indicated as the secondary WAP.

FIG. 7B continues the illustration of the process 700 and includes, at an operation 718, the first wireless router determining that the second signal strength and/or quality is greater than the first signal strength and/or quality. For instance, the first wireless router may compare the RSSI measured by the first wireless router to the RSSI measured by the second wireless router and determine that the former is greater. Further, in examples where the first wireless router receives multiple RSSI values, each from a respective router of the mesh network, the first wireless router may identify the highest RSSI value from among the multiple values.

An operation 720 represents establishing the wireless connection between the first wireless router and the secondary WAP based at least in part on determining that the first wireless router has the highest RSSI with the secondary WAP. Thus, in this example, the first wireless router may operate as the router within the mesh network that connects to the secondary WAP that is connected to the cellular network or other network to for providing network access within the environment. It is to be appreciated that the first wireless router may establish the connection with the secondary WAP using the credential data previously provided to and stored at the first wireless router.

An operation 722 represents determining, after the establishing the wireless connection, that a signal strength and/or quality of the secondary WAP detected by the first wireless router is less than a threshold value. That is, this operation may comprise determining that the RSSI of the secondary WAP measured by the first wireless router is relatively low or poor. In some instances, this threshold value may be less than a threshold value used to determine whether or not to initially connect with the secondary WAP. Further, in response to determining that the signal strength and/or quality is below this threshold value, the first wireless router may terminate the second wireless connection in some instances, while in other instances it may maintain the connection until and if a stronger connection is located.

An operation 724 represents sending, to the second wireless router, instruction data representing an instruction to scan for available wireless networks in the environment. That is, upon determining that the signal strength and/or quality between the first wireless router and the secondary WAP is low, the first wireless router may instruct the other routers of the mesh network to scan for available wireless networks.

An operation 726 represents the first wireless router again scanning for available wireless networks in the environment. As described above, this operation may comprise the first wireless router attempting to detect, and output an indication of, one or more WAPs of networks that available and within range of the first wireless router. The second wireless router, and any other wireless routers of the mesh network, may similarly scan the environment for available WAPs. In addition, the first wireless router, and other routers of the mesh network, may also measure and store an indication of a respective signal strength and/or quality (e.g., dBm, RSSI, etc.) of each identified WAP. The first wireless router and/or another wireless router of the mesh network may establish a connection with the same or another secondary WAP if the corresponding device is determined to be available and have a threshold signal strength and/or quality, as described above.

An operation 728 represents, meanwhile, that in this example the first wireless router determines that the connection with the ISP server is available. That is, this operation may represent the first wireless router determining that the ISP server is "online", meaning it is able to reached by the first wireless router (or other router in the mesh network). Further, the first wireless router may make this determination by itself detecting the ISP server or based on receiving a corresponding indication from the second wireless router or another wireless router in the mesh network.

An operation 730 represents re-establishing the network connection with the ISP server at least partly in response to the detecting. That is, this operation may comprise the first wireless router terminating the second wireless connection with the secondary WAP (unless already terminated) and re-establishing the network connection with the ISP server. The first wireless router may also send an indication of the new first wireless connection to other routers within the mesh network. Further, while this example describes the first wireless router re-establishing the network connection, in other instances another wireless router of the mesh network may re-establish this connection.

Figure 8A:
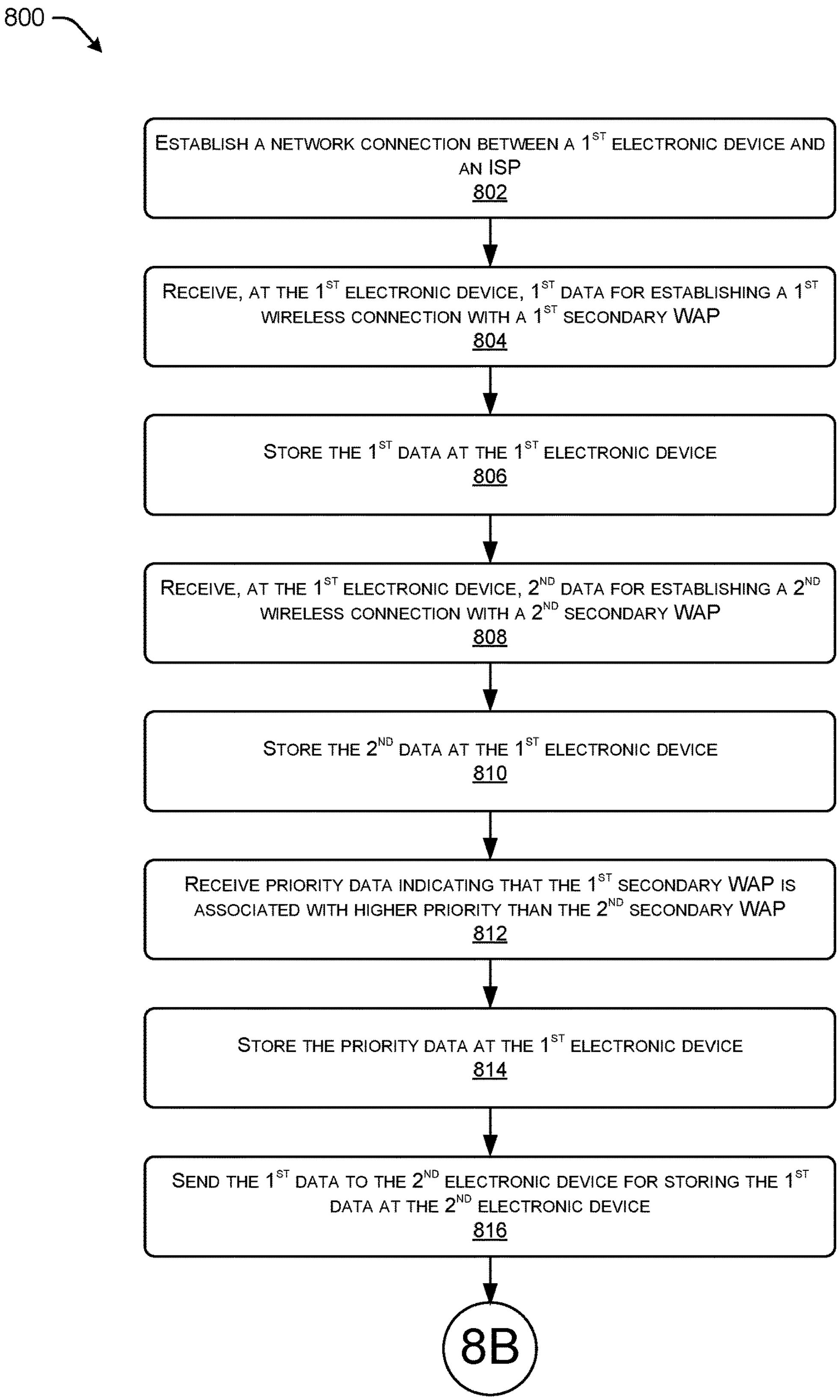
FIGS. 8A-B collectively illustrate a flow diagram of another example process for configuring a secondary WAP, determining that a connection with an ISP has become unavailable, and transitioning to using the secondary WAP such that the devices within the device environment maintain connection to the Internet or other network.
Figure 8B:
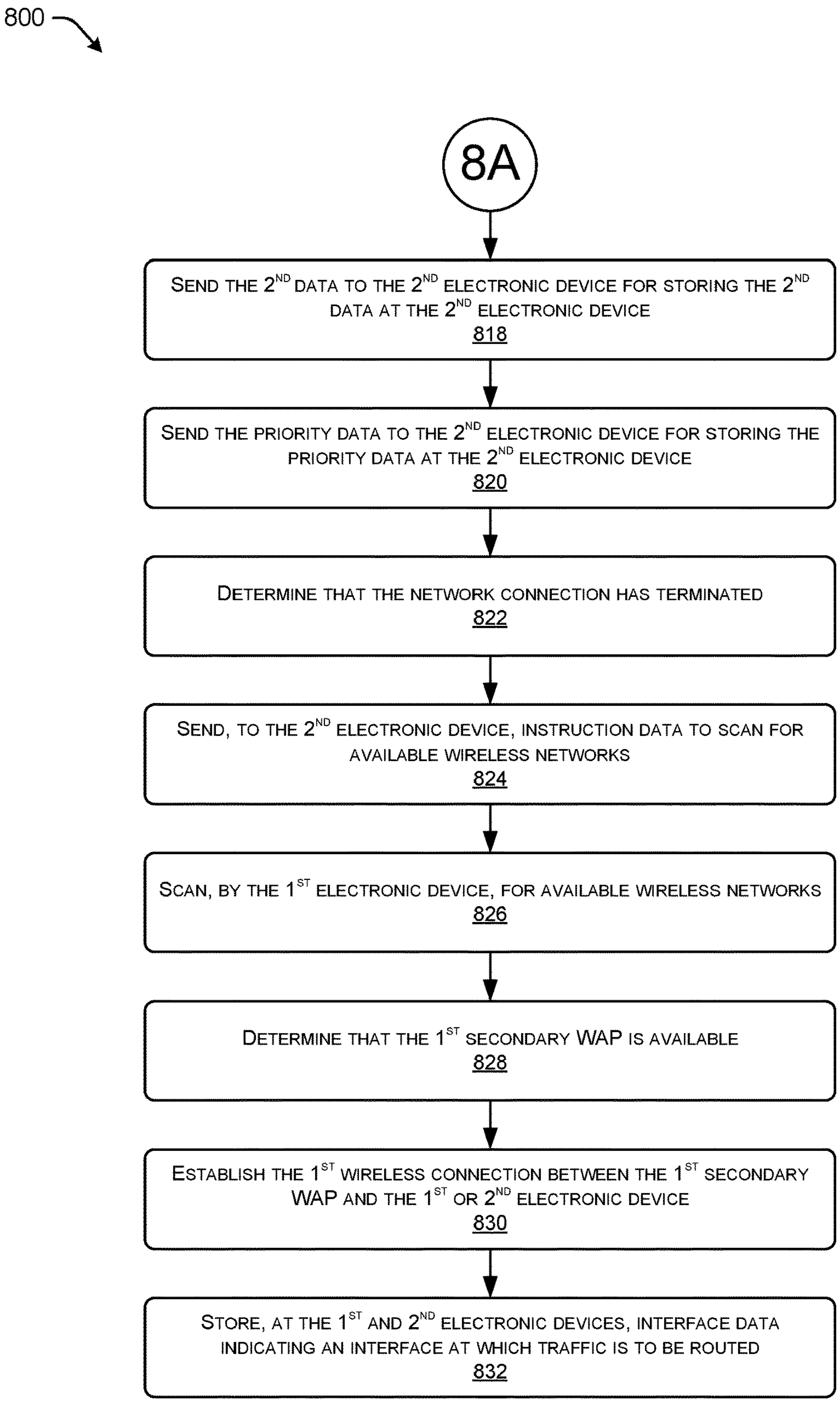

FIGS. 8A-B collectively illustrate a flow diagram of another example process 800 for configuring a secondary WAP, determining that an ISP server has become unavailable, and transitioning to using the secondary WAP such that the devices within the device environment maintain connection to the Internet or other network.

An operation 802 represents establishing a network connection between a first electronic device and an ISP server, the first electronic device operating as a primary WAP in an environment of the first electronic device, the environment including a second electronic device wirelessly connected to the first electronic device. In some instances, the first electronic device comprises a first wireless router of a wireless mesh network and the second electronic device comprises a second wireless router of the wireless mesh network.

An operation 804 represents receiving, at the first electronic device, first data for establishing a wireless connection with a secondary WAP at least partly in response to termination of the network connection with the ISP server. An operation 806 represents storing the first data at the first electronic device.

An operation 808 represents receiving second data at the first electronic device prior to termination of the network connection, the second data comprising credentials for establishing a wireless connection with a second secondary WAP. An operation 810 represents storing the second data at the first electronic device.

An operation 812 represents receiving priority data indicating that the first secondary WAP is associated with a higher priority than the second secondary WAP. An operation 814 represents storing the priority data at the first electronic device. As described above, for instance, a user may indicate, via user-input data received via a UI provided by the application described above, a first device that is to operate as a highest-priority secondary WAP such that this device will perform the role of secondary WAP if a connection to this device is available, a second device that is to operate a second highest-priority secondary WAP such that this device will perform the role of secondary WAP if a connection to the first device is not available but a connection to this second device is available, and so forth.

An operation 816 represents sending the first data to the second electronic device for storing the first data at the second electronic device.

FIG. 8B continues the illustration of the process 800 and includes, at an operation 818, sending the second data to the second electronic device for storing the second data at the second electronic device. An operation 820 represents sending the priority data to the second electronic device for storing the priority data at the second electronic device.

An operation 822 represents determining that the network connection with the ISP server has terminated. An operation 824 represents sending, to the second electronic device, instruction data representing an instruction to scan for available wireless networks in the environment. An operation 826 represents scanning, by the first electronic device, for available wireless networks in the environment.

An operation 828 represents determining that secondary WAP is available. An operation 830 represents establishing, using the first data, the wireless connection between the secondary WAP and at least one of the first electronic device or the second electronic device. An operation 832 represents storing, at the first electronic device and the second electronic device, interface data indicating an interface of the second electronic device at which data is to be routed.

Figure 9:
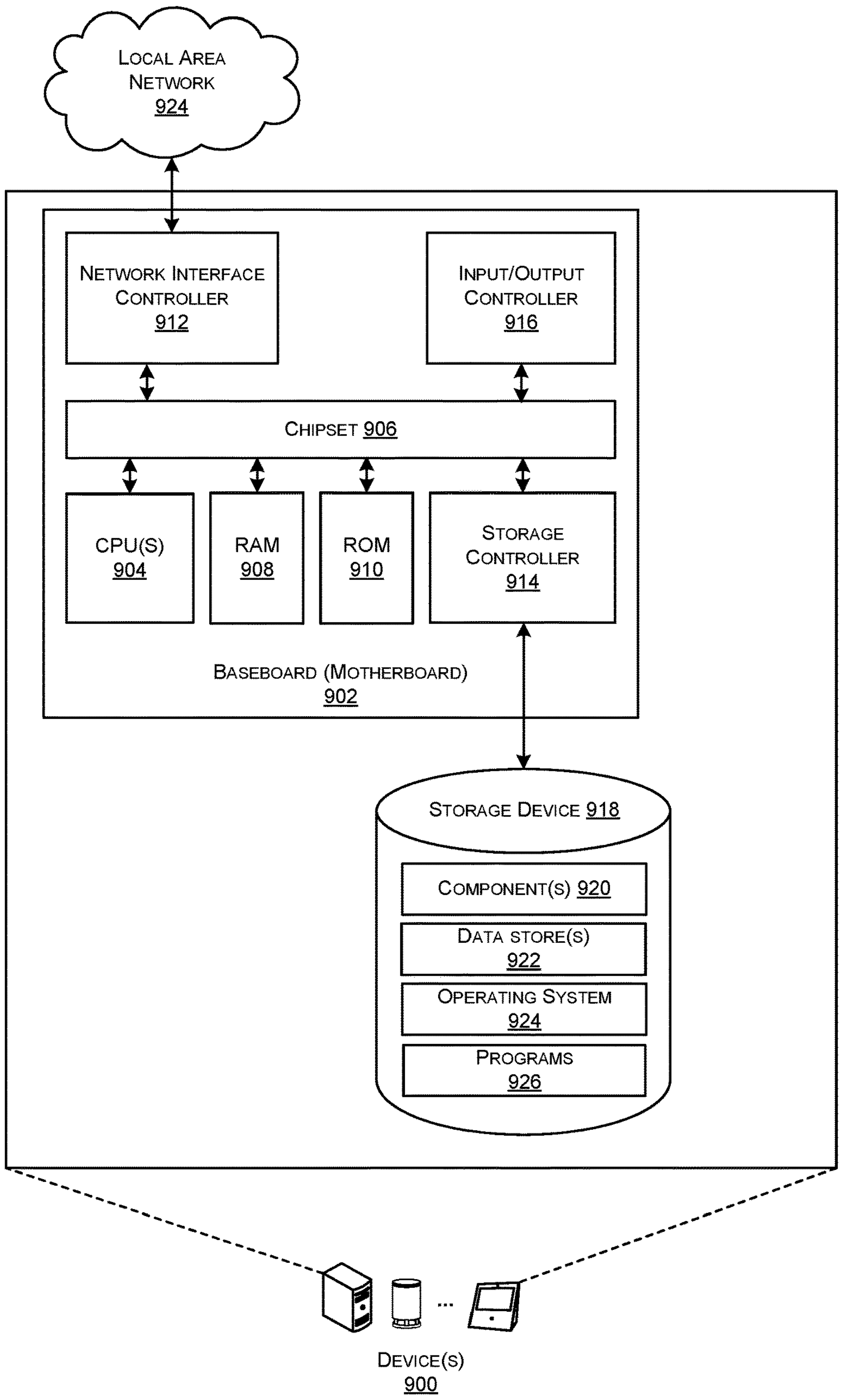
FIG. 9 illustrates example components that electronic devices and systems described herein may include.

FIG. 9 is a computer architecture diagram showing an illustrative computer hardware architecture for implementing any of the devices or systems described above that can be utilized to implement aspects of the various technologies presented herein. Any of the wireless routers 104(1)-(N), the client devices 112, the secondary WAPs, or the server computing devices of the remote system 116, discussed above, may include some or all of the components discussed below with reference to the system 900.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the systems can also be configured to execute a resource manager capable of instantiating and/or managing the computing resources. In the case of VM instances, for example, the resource manager can be a hypervisor or another type of program configured to enable the execution of multiple VM instances on a single server system. Systems in a data center can also be configured to provide network services and other types of services.

The system 900 includes a baseboard 902, or "motherboard," which is a printed circuit board to which a multitude of components or devices can be connected by way of a system bus or other electrical communication paths. In one illustrative configuration, one or more central processing units (CPUs) 904 operate in conjunction with a chipset 906. The CPUs 904 can be standard programmable processors that perform arithmetic and logical operations necessary for the operation of the system 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the system 900. The chipset 906 can further provide an interface to a computer-readable storage medium such as a read-only memory (ROM) 510 or non-volatile RAM (NVRAM) for storing basic routines that help to startup the system 900 and to transfer information between the various components and devices. The ROM 910 or NVRAM can also store other software components necessary for the operation of the system 900 in accordance with the configurations described herein.

The system 900 can operate in a networked environment using logical connections to remote computing devices and computer systems through a network, such as a local area network 924. The chipset 906 can include functionality for providing network connectivity through a Network Interface Card (NIC) 912, such as a gigabit Ethernet adapter. The NIC 912 is capable of connecting the system 900 to other computing devices over the network. It should be appreciated that multiple NICs 912 can be present in the system 900, connecting the computer to other types of networks and remote computer systems.

The system 900 can be connected to a storage device 918 that provides non-volatile storage for the computer. The storage device 918 can store an operating system 920, programs 922, and data, which have been described in greater detail herein. The storage device 918 can be connected to the system 900 through a storage controller 914 connected to the chipset 906. The storage device 918 can consist of one or more physical storage units. The storage controller 914 can interface with the physical storage units through a serial attached SCSI (SAS) interface, a serial advanced technology attachment (SATA) interface, an FC interface, or other type of interface for physically connecting and transferring data between computers and physical storage units.

The system 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the system 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The system 900 can further read information from the storage device 918 by detecting the physical states or characteristics of one or more particular locations within the physical storage units.

In addition to the mass storage device 918 described above, the system 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the system 900.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the system 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the system 900.

In one embodiment, the storage device 918 or other computer-readable storage media is encoded with computer-executable instructions which, when loaded into the system 900, transform the computer from a general-purpose computing system into a special-purpose computer capable of implementing the embodiments described herein. These computer-executable instructions transform the system 900 by specifying how the CPUs 904 transition between states, as described above. According to one embodiment, the system 900 has access to computer-readable storage media storing computer-executable instructions which, when executed by the system 900, perform the various processes described above with regard to FIGS. 2-7B. The system 900 can also include computer-readable storage media having instructions stored thereupon for performing any of the other computer-implemented operations described herein.

The system 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the system 900 might not include all of the components shown in FIG. 9, can include other components that are not explicitly shown in FIG. 9, or might utilize an architecture completely different than that shown in FIG. 9.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) may possess its own local memory, which also may store program modules, program data, and/or one or more operating systems. The processors(s) may be located in a single device or system, or across disparate devices or systems, which may be owned or operated by various entities.

The computer-readable media described herein may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices. RAID storage systems, or any other medium which can be used to store the desired information and which can be accessed by a computing device. The computer-readable media may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part at a first wireless router of a wireless mesh network that includes at least the first wireless router and a second wireless router, the method comprising:

establishing a network connection between the first wireless router and an Internet Service Provider (ISP);

storing, at the first wireless router, credential data associated with establishing, at least partly in response to termination of the network connection, a wireless connection with a secondary wireless access point (WAP);

determining, after the storing, that the network connection has terminated;

sending, to the second wireless router and in response to the determining that the network connection has terminated, instruction data representing an instruction to scan for available wireless networks in the environment;

scanning, by the first wireless router, for available wireless networks in the environment;

determining, based on at least one of the sending or the scanning, that a secondary WAP is available; and establishing, using the credential data, the wireless connection between the first wireless router and the secondary WAP.

2. The method as recited in claim 1, wherein the secondary WAP is a mobile electronic device connected to a cellular network or a network device connected to the ISP with a wired connection or to another ISP.

3. The method as recited in claim 1, further comprising:

receiving, from the second wireless router, first data indicating a first signal strength or quality associated with the secondary WAP measured by the second wireless router;

determining second data indicating a second signal strength or quality associated with the secondary WAP measured by the first wireless router;

determining that the second signal strength or quality is greater than the first signal strength or quality;

and wherein the establishing the wireless connection comprises establishing the wireless connection at least partly in response to determining that the second signal strength or quality is greater than the first signal strength or quality.

4. The method as recited in claim 1, wherein the determining that the secondary WAP is available comprises determining that a first signal strength or quality associated with the secondary WAP, measured by the first wireless router, is greater than a first threshold value, the method further comprising:

determining, after the establishing the wireless connection, that a second signal strength or quality associated with the secondary WAP, measured by the first wireless router, is less than a second threshold value, the second threshold value being less than the first threshold value; and sending, to the second wireless router, second instruction data to scan for the secondary WAP.

5. The method as recited in claim 1, further comprising:

detecting, by the first wireless router and after the establishing the wireless connection, that the network connection between the first wireless router and the ISP is available; and re-establishing the network connection at least partly in response to the detecting.

6. A method comprising:

establishing, in an environment that includes a first electronic device wirelessly connected to a second electronic device, a network connection between the first electronic device and an Internet Service Provider (ISP) server;

storing, at the first electronic device, first data associated with establishing, at least partly in response to termination of the network connection, a wireless connection with a secondary wireless access point (WAP) connected to the ISP server or a different ISP server;

determining, after the storing, that the network connection has terminated;

sending, to the second electronic device and in response to the determining the network connection has terminated, instruction data representing an instruction to scan for available wireless networks in the environment;

scanning, by the first electronic device, for available wireless networks in the environment;

determining that the secondary WAP is available; and establishing, using the first data, the wireless connection between the secondary WAP and at least one of the first electronic device or the second electronic device.

7. The method as recited in claim 6, wherein the first electronic device comprises a first wireless router of a wireless mesh network and the second electronic device comprises a second wireless router of the wireless mesh network.

8. The method as recited in claim 6, wherein the first data comprises a service set identifier (SSID) associated with the secondary WAP and a password associated with the secondary WAP.

9. The method as recited in claim 6, wherein the secondary WAP comprises a first secondary WAP, and further comprising:

receiving the first data at the first electronic device prior to termination of the network connection;

receiving second data at the first electronic device prior to termination of the network connection, the second data comprising credentials associated with establishing a wireless connection with a second secondary WAP;

storing the second data at the first electronic device; and receiving priority data indicating that the first secondary WAP is associated with a higher priority than the second secondary WAP.

10. The method as recited in claim 9, wherein the establishing the wireless connection comprises establishing, using the first data, the wireless connection at least partly in response to determining that the first secondary WAP is associated with the higher priority than the second secondary WAP.

11. The method as recited in claim 6, wherein the instruction data comprises first instruction data, the establishing comprises establishing, using the first data, the wireless connection between the secondary WAP and the first electronic device, and the method further comprises:

determining, by the first electronic device, that a signal strength or quality associated with the secondary WAP is less than a threshold signal strength or quality;

sending, to the second electronic device, second instruction data representing an instruction to scan for the secondary WAP;

receiving an indication that the secondary device detected a signal strength or quality associated with the secondary WAP that is greater than a signal strength or quality associated with the secondary WAP at the first electronic device; and disconnecting, by the first electronic device, from the secondary WAP.

12. The method as recited in claim 11, wherein the wireless connection comprises a first wireless connection, and the method further comprises:

establishing, using the first data, a second wireless connection between the second electronic device and the secondary WAP; and establishing, by the first electronic device, a third wireless connection between the first electronic device and the second electronic device.

13. The method as recited in claim 6, wherein the establishing the wireless connection comprises establishing, using the first data, the wireless connection between the secondary WAP and the second electronic device, and further comprising:

establishing a connection between the first electronic device and the second electronic device;

storing, at the first electronic device, interface data indicating an interface associated with the connection between the first electronic device and the second electronic device.

14. A computing device comprising:

one or more processors; and one or more non-transitory computer-readable media storing computer-executable instructions that, when executed, cause the one or more processors to perform acts comprising:

establishing, in an environment that includes the computing device wirelessly connected to a second electronic device, a network connection between the computing device and an Internet Service Provider (ISP) server;

storing first data associated with establishing, at least partly in response to termination of the network connection, a wireless connection with a secondary wireless access point (WAP) connected to the ISP server or a different ISP server;

determining, after the storing, that the network connection has terminated;

sending, to the second electronic device and in response to the determining the network connection has terminated, instruction data representing an instruction to scan for available wireless networks in the environment;

scanning for available wireless networks in the environment;

determining that the secondary WAP is available; and establishing, using the first data, the wireless connection between the secondary WAP and at least one of the computing device or the second electronic device.

15. The computing device as recited in claim 14, wherein the computing device comprises a first wireless router of a wireless mesh network and the second electronic device comprises a second wireless router of the wireless mesh network.

16. The computing device as recited in claim 14, wherein the first data comprises a service set identifier (SSID) associated with the secondary WAP and a password associated with the secondary WAP.

17. The computing device as recited in claim 14, wherein the secondary WAP comprises a first secondary WAP, and the acts further comprise:

receiving the first data prior to termination of the network connection;

receiving second data prior to termination of the network connection, the second data comprising credentials associated with establishing a wireless connection with a second secondary WAP;

storing the second data; and receiving priority data indicating that the first secondary WAP is associated with a higher priority than the second secondary WAP.

18. The computing device as recited in claim 17, wherein establishing the wireless connection comprises establishing, using the first data, the wireless connection at least partly in response to determining that the first secondary WAP is associated with the higher priority than the second secondary WAP.

19. The computing device as recited in claim 14, wherein the instruction data comprises first instruction data, establishing the wireless connection comprises establishing, using the first data, the wireless connection between the secondary WAP and the computing device, and the acts further comprise:

determining that a signal strength or quality associated with the secondary WAP is less than a threshold signal strength or quality;

sending, to the second electronic device, second instruction data representing an instruction to scan for the secondary WAP;

receiving an indication that the second electronic device detected a signal strength or quality associated with the secondary WAP that is greater than a signal strength or quality associated with the secondary WAP at the computing device; and disconnecting from the secondary WAP.

20. The computing device as recited in claim 19, wherein the wireless connection comprises a first wireless connection, and the acts further comprise:

establishing, using the first data, a second wireless connection between the second electronic device and the secondary WAP; and establishing a third wireless connection between the computing device and the second electronic device.

21. The computing device as recited in claim 14, wherein establishing the wireless connection comprises establishing, using the first data, the wireless connection between the secondary WAP and the second electronic device, and the acts further comprise:

establishing a connection between the computing device and the second electronic device;

storing interface data indicating an interface associated with the connection between the computing device and the second electronic device.

* * * * *